(12) United States Patent
Love

(10) Patent No.: US 8,020,584 B2
(45) Date of Patent: Sep. 20, 2011

(54) VARIABLE VALVE FOR IMPACT DISPERSAL DEVICE

(76) Inventor: Phillip W. Love, Smithville, TN (US)

( * ) Notice: Subject to any disclaimer, the term of this patent is extended or adjusted under 35 U.S.C. 154(b) by 237 days.

(21) Appl. No.: 12/348,787

(22) Filed: Jan. 5, 2009

(65) Prior Publication Data

US 2009/0120748 A1 May 14, 2009

Related U.S. Application Data

(63) Continuation-in-part of application No. 11/380,541, filed on Apr. 27, 2006, now Pat. No. 7,472,935.

(60) Provisional application No. 61/033,543, filed on Mar. 4, 2008, provisional application No. 60/677,147, filed on May 3, 2005.

(51) Int. Cl.
*F16K 21/04* (2006.01)

(52) U.S. Cl. ......... 137/540; 137/494; 188/371; 293/134

(58) Field of Classification Search .......... 188/371–377; 137/522, 529, 538–540; 293/134
See application file for complete search history.

(56) References Cited

U.S. PATENT DOCUMENTS

| | | | |
|---|---|---|---|
| 2,092,793 A | 9/1937 | Abercrombie | |
| 2,890,715 A * | 6/1959 | Ebersold | 137/494 |
| 3,073,340 A * | 1/1963 | Hancock | 137/565.11 |
| 3,344,894 A | 10/1967 | Kenworthy | |
| 3,592,485 A | 7/1971 | Buhl | |
| 3,677,595 A | 7/1972 | Hamilton | |
| 3,731,770 A | 5/1973 | Bindon | |
| 3,756,643 A | 9/1973 | Weed | |
| 3,873,075 A | 3/1975 | Pamer | |
| 3,947,061 A | 3/1976 | Ellis | |
| 4,056,040 A | 11/1977 | Fussangel | |
| 4,153,237 A | 5/1979 | Supalla | |
| 4,190,239 A | 2/1980 | Schwankhart | |
| 4,326,733 A | 4/1982 | Rubalcava | |
| 4,501,291 A * | 2/1985 | Siegrist | 137/529 |
| 4,540,018 A * | 9/1985 | Dantlgraber | 137/540 |
| 4,718,325 A | 1/1988 | Shore | |
| 5,094,407 A | 3/1992 | Jampy | |
| 5,096,026 A | 3/1992 | Vautour | |
| 5,096,242 A | 3/1992 | Chin-Hun | |

(Continued)

OTHER PUBLICATIONS

PCT ISR and WO from PCT Serial No. PCT/US2006/15914 mailed Sep. 18, 2007.

(Continued)

*Primary Examiner* — Christopher Schwartz
(74) *Attorney, Agent, or Firm* — Knox Patents; Thomas A. Kulaga

(57) ABSTRACT

A variable valve for impact dispersal of a force, such as a force caused by an impact or explosion. The apparatus includes a valve with a spring biased piston that engages an outlet bore as the piston moves in response to the pressure of a fluid at an inlet port. The valve is in fluid communication with a cylinder that receives an impulse force. The fluid flow from the cylinder is controlled by the variable valve, which disperses the force accordingly at a controlled rate. In one embodiment, a pressurized reservoir is connected to an extension valve and a check valve that allows the cylinder to be filled with fluid from the reservoir when the extension valve is actuated. Applications for such a system include connection to aircraft seats and to aircraft landing gear.

20 Claims, 12 Drawing Sheets

U.S. PATENT DOCUMENTS

| | | |
|---|---|---|
| 5,286,138 A | 2/1994 | Goodwin |
| 5,290,089 A | 3/1994 | Oleszko |
| 5,330,132 A | 7/1994 | Lucienne et al. |
| 5,337,560 A | 8/1994 | Abdelmalek |
| 5,370,429 A | 12/1994 | Reuber |
| 5,454,622 A | 10/1995 | Demopoulos |
| 5,531,422 A | 7/1996 | Ward et al. |
| 5,588,510 A | 12/1996 | Wilke |
| 5,722,722 A | 3/1998 | Massars |
| 5,836,647 A | 11/1998 | Turman |
| 6,050,637 A | 4/2000 | Haland |
| 6,312,027 B1 | 11/2001 | Yang |
| 6,334,643 B1 | 1/2002 | Lindblad |
| 6,386,345 B1 | 5/2002 | Hamilton |
| 6,416,127 B1 | 7/2002 | Galbreath |
| 6,435,578 B1 | 8/2002 | Li |
| 6,837,266 B2 * | 1/2005 | Fredrickson et al. ......... 137/529 |
| 7,226,105 B2 | 6/2007 | Christopher |
| 2005/0088006 A1 | 4/2005 | Christopher |

OTHER PUBLICATIONS

International Search Report (ISR) and Written Opinion (WO) for International Application No. PCT/US2009/35785, mailed date Apr. 24, 2009.

* cited by examiner

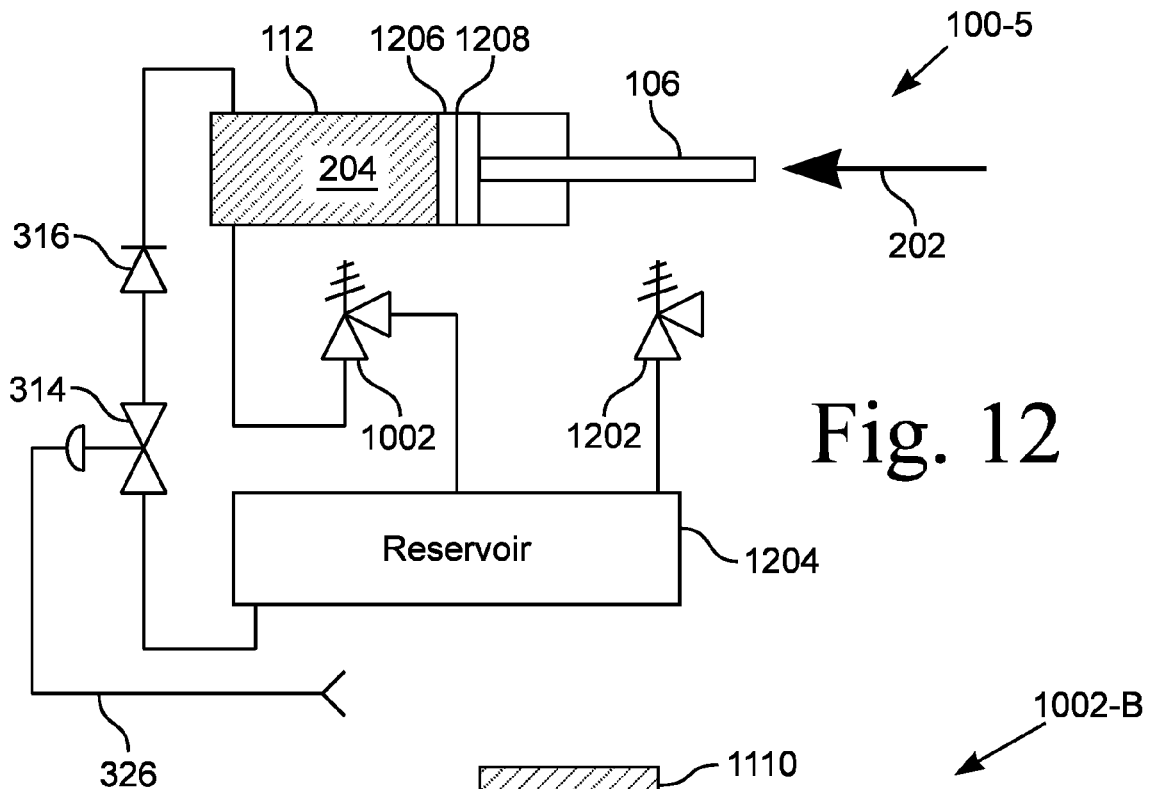

VARIABLE VALVE FOR IMPACT DISPERSAL DEVICE

CROSS-REFERENCE TO RELATED APPLICATIONS

This Application claims the benefit of provisional application Ser. No. 61/033,543, filed Mar. 4, 2008. This application is a continuation-in-part of non-provisional application Ser. No. 11/380,541, filed on Apr. 27, 2006, which claims the benefit of provisional application Ser. No. 60/677,147, filed May 3, 2005.

STATEMENT REGARDING FEDERALLY SPONSORED RESEARCH OR DEVELOPMENT

Not Applicable

BACKGROUND OF THE INVENTION

1. Field of Invention

This invention pertains to an impact dispersal system. More particularly, this invention pertains to a variable valve for an impact dispersal system.

2. Description of the Related Art

In today's fast paced society, there are sudden stops and unexpected impacts. When these sudden stops and impacts involve vehicles or other massive objects, injury and/or equipment damage is likely. Various attempts have been made to minimize the damage due to such impacts.

For example, U.S. Pat. No. 3,677,595, titled "Automobile Bumper," issued on Jul. 18, 1972, discloses a bumper that is hydraulically extended by actuation of an electric switch connected to the brake pedal of a vehicle. The switch connects the power steering system to hydraulic cylinders that extend the bumper away from the vehicle. Upon an impact of the extended bumper, the pressure in the hydraulic cylinders is relieved by a pressure relief valve that allows the hydraulic fluid to return to the power steering system.

U.S. Pat. No. 3,947,061, titled "Extensible vehicle bumper," issued on Mar. 30, 1976, discloses a motor vehicle bumper that is operated by hydraulic slave cylinders connected to the master brake cylinder to extend the bumper upon the application of a predetermined amount of force to the brake to provide the bumper with a greater shock absorbing length of travel under collision conditions. A spring forces the extended bumper to return to a non-extended position. Upon impact, the hydraulic pressure is relieved through a valve returning the hydraulic fluid to the brake system.

U.S. Pat. No. 5,096,242, titled "Shock-absorbing bumper system," issued on Mar. 17, 1992, discloses a brake-actuated shock-absorbing bumper system for an automotive vehicle. The shock-absorbing bumper system includes a supply subsystem 1 for supplying pressurized working fluid, a pressure-balancing subsystem 2, a switching subsystem 3, front and rear bumper subsystems 4 and 4', a feedback subsystem 5, a safety-control subsystem 6, and a conduit system having a plurality of oil paths for connecting subsystems 1, 2, 3, 4, 4', 5, and 6. In one embodiment, illustrated in FIGS. 6 and 6A, the bumper 41, after being subject to an impact, has a working fluid within a second chamber 45 that absorbs a portion of the impact, a spring 47 that absorbs a portion of the impact, and a receiving space 481 that receives the cylinder 40 after a shear pin 43 breaks. U.S. Pat. No. 6,312,027, titled: Shock absorbing system for an automotive vehicle," issued on Nov. 6, 2001, is a later-issued patent by the same inventor that discloses a shock absorbing system for an automotive vehicle with additional features.

U.S. Pat. No. 5,286,138, titled "Vehicle positioning methods and apparatus with impact damper," issued on Feb. 15, 1994, discloses a pair of hydraulic cylinders 68, 69 having a check valve 108 in parallel with a needle valve 109 connected to the hydraulic cylinder 68, 69. The check valve 108 allows for filling the hydraulic cylinder 68, 69 without subsequent escape of the fluid, and the needle valve 109 allows hydraulic fluid to bleed from the cylinder68, 69, which results in a slow retraction of the pistons 72, 73.

U.S. Pat. No. 5,370,429, titled "Bumper system having an extendable bumper for automotive vehicles," issued on Dec. 6, 1994, discloses a hydraulic cylinder connected to a vehicle bumper, with the bumper being extended from the vehicle in response to conditions indicative of an imminent accident. In one embodiment, the cylinder includes a groove with a decreasing opening corresponding to the amount of retraction of the cylinder. The groove with the variable sized opening changes the impact resistance based on the amount of extension of the bumper.

U.S. Pat. No. 6,435,578, titled "Energy dissipating device for an automobile bumper," issued on Aug. 20, 2002, discloses a hollow rod piston 2, 10 that selectively closes damping holes 6, 14 as the hydraulic cylinder, or energy dissipater, 3, 11 dissipates the energy from an impact.

BRIEF SUMMARY OF THE INVENTION

An impact dispersal system includes a variable dispersion valve connected to a cylinder. The variable dispersion valve includes a piston inside a valve body, a spring forcing the piston toward a seat, and a discharge port configured to allow a greater flow rate as the piston moves away from the seat. One end of the piston has a ball that engages a seat for sealing the inlet port of the valve. The opposite end of the piston engages a spring that is set to apply a specific force to the piston to seat the ball. In one embodiment, the spring force is adjustable. The sidewall of the cylinder has a discharge port. In one embodiment, the discharge port has a tapered opening that increases in size in the direction away from the valve seat. In another embodiment, the discharge port has a cylindrical bore with an edge substantially aligned with the seat of the valve. The discharge port is positioned to be uncovered by the end of the piston with the ball seat. The end of the piston opposite the ball seat is sealed from the portion of the cylinder containing the spring. In one embodiment, the seal includes an o-ring.

When a high pressure fluid, such as a liquid or gas, is connected to the inlet port, the high pressure fluid applies a force against the ball and piston. As the pressure in the inlet increases, the valve piston moves away from the seat, resisted by the spring. As the seat end of the piston uncovers the discharge port, the high-pressure fluid from the inlet is discharged. If the volume of discharge is not sufficient to decrease the pressure at the inlet, the piston continues moving away from the seat, thereby exposing a greater portion of the discharge port.

In one embodiment, the valve is a variable dispersion return valve that includes a second piston with the spring disposed between the two pistons. The second piston has a larger surface area than the first piston. The valve includes a fluid connection between the inlet area and a cavity containing the second piston. When the pressure at the inlet port is sufficient to lift the first piston, such as when a setpoint is reached, a fluid connection is established with the cavity of the second piston, which causes the second piston to restrain the first piston. In this way the valve opens quickly and then, after a short delay, begins to shut down, thereby allowing the impact to be dispersed over a period of time.

The impact dispersal system includes the variable dispersion valve in fluid connection with the discharge of a cylinder. The cylinder has a piston connected to a shaft or piston rod. The shaft is configured to receive shock or impact loads and to transfer those loads to the piston such that the fluid in the cylinder is pressurized by the load and bleeds out at a controlled rate, with the impact dispersal system thereby dispersing the energy from the impact. An impact is a high force or shock that is applied over a short time period.

The discharge port of the variable dispersion valve feeds a catch tank or reservoir. In one such embodiment, the catch tank is pressurized sufficiently that the fluid in the tank is forced into the cylinder through another path. A valve in that path opens, thereby allowing the fluid to enter the cylinder and extend the piston in the cylinder. The valve is then closed, placing the system in condition for the piston to receive an impact and thereby increasing the range of motion during the impact. During an impact the pressure in the cylinder increases. If the pressure increase is sufficient to actuate the variable dispersion valve, then the fluid re-enters the catch tank as the piston retracts from the impact, as dispersed through the variable dispersion valve.

A vehicle impact dispersal system includes at least one cylinder between two portions of the vehicle. The cylinder is in fluid communication with a variable dispersion valve that allows for impact dispersal between the two portions of the vehicle. In one such embodiment of the vehicle impact dispersal system, the portion of the vehicle that is subject to the impact is the landing gear wheels and the other portion of the vehicle is a frame. The landing gear wheels are extended before an impact, thereby increasing the range of motion during the impact.

In another such embodiment of the vehicle impact dispersal system, the portion of the vehicle that is subject to the impact is a seat and the other portion of the vehicle is a frame that supports the seat. In one such embodiment, the seat has a back that pivots at a lower end. The upper end of the seat back is supported by the cylinder. During either a front or rear impact, the seat back is forced in the forward/rearward direction. The impact force is dispersed by the cylinder and the variable dispersion valve, thereby limiting the g-forces experienced by an occupant of the seat.

In another such embodiment of the seat impact dispersal system, the seat is an aircraft seat, for example, a troop seat, that has a sliding engagement with the frame. The cylinder is mechanically linked between the troop seat and the frame. In still another such embodiment of the seat impact dispersal system, the seat includes a seat bottom with the cylinder between the seat bottom and the frame. The seat bottom is extended upwards by the cylinder before an impact, thereby increasing the range of motion during the impact.

BRIEF DESCRIPTION OF THE SEVERAL VIEWS OF THE DRAWINGS

The above-mentioned features of the invention will become more clearly understood from the following detailed description of the invention read together with the drawings in which:

FIG. 12 is a schematic diagram of another embodiment of an impact dispersal system with an automatically extending feature;

FIG. 13 is a cross-sectional view of another embodiment of a variable dispersion return valve;

DETAILED DESCRIPTION OF THE INVENTION

An apparatus for dispersing impacts is disclosed. The impact dispersal system is generally shown as 100 in the figures. The impact dispersal system 100 disperses the energy from an impact after the pressure in the system 100 reaches a selected pressure setting. An impact is a high force or shock that is applied over a short time period, such as caused by an object striking another at a high velocity. The rate of flow is controlled by, in various embodiments, adjustable or fixed orifices. The impact dispersal system 100 works with no recoil. As used herein, the term "vehicle" is used in its broad, common meaning of a means of carrying or transporting something. For example, an automobile is a motor vehicle, which is one type of a vehicle. A, aircraft, a trailer, and a wagon are other examples of vehicles. Crates, carriages, containers, and pallets are also vehicles.

Figure 1:
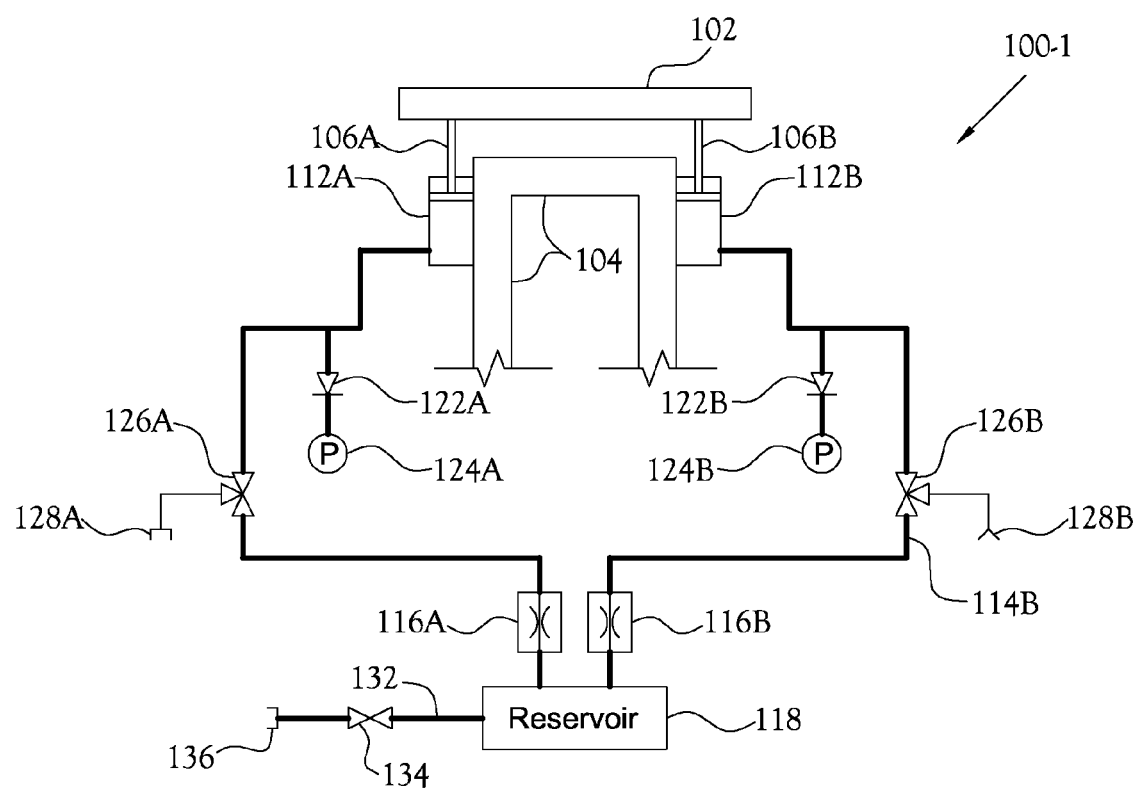
FIG. 1 is a schematic diagram of one embodiment of an impact dispersal system attached to a vehicle bumper.

FIG. 1 illustrates a schematic diagram of one embodiment of an impact dispersal system 100-1 attached to a vehicle bumper 102. In the illustrated embodiment, the impact dispersal system 100 is disposed between a vehicle chassis, or frame, 104 and a vehicle bumper 102. An impact to the bumper 102 parallel to the longitudinal axis of the piston rods 106 connecting the bumper 102 to the cylinders 112 allows the system 100 to disperse the effects of the impact by slowly decelerating the vehicle. Those skilled in the art will recognize that the impact dispersal system 100-1 can be positioned at either the front or rear of the vehicle, or at both locations, without departing from the spirit and scope of the present invention. In various embodiments, the bumper 102 is a beam structure or a cable-type structure that is positioned to struck before other portions of the vehicle during a collision resulting in an impact to the bumper 102.

The impact dispersal system 100-1 includes a pair of cylinders 112A, 112B connected to a pair of three-way fill valves 126A, 126B by way of tubing 114A, 114B, a pair of flow restrictors, or orifices, 116A, 116B, and a catch tank, or reservoir, 118. Connected to each three-way fill valves 126A, 126B is a connection 128A, 128B for filling the system. In one embodiment, the connection 128 allows for fluid 204 to be pulled from the catch tank 118 into the cylinders 112 to push the cylinders 112 so that the piston rod 106 is in the extended position. In one embodiment, the fluid 204 is an incompressible liquid, such as a hydraulic fluid. In another embodiment, the fluid is a compressed gas, such as air. In one embodiment of the impact dispersal system 100, the system 100 discharges the fluid 204 to the atmosphere and not into the catch tank 118. In such an embodiment, the fluid 204 is a bio-degradable or otherwise benign fluid. For a single-use system, the fluid 204 does not need to be retained and environmental friendly fluids will not contaminate the ground.

In one embodiment, the flow restrictors, or orifices, 116 are adjustable orifices that allow varying the flow rate from the cylinders 112. In another embodiment, the flow restrictors, or orifices, 116 are orifices that are fixed, that is, the restrictors 116 are not adjustable. In this embodiment, the flow restrictors, or orifices, 116 are selected for the application.

For testing purposes, connected to each piece of tubing 114 is a check valve 122 and pressure gauge 124. The pressure gage 124 indicates the maximum pressure of the system. The catch tank 118 includes a pipe 132 connected to a valve 134 and a connector 136. Opening the valve 134 after a supply of fluid is connected to the connector 136 allows the catch tank 118 to be filled. Likewise, the catch tank 118 can be drained by opening the valve 134 with the connector 136 draining into an appropriate receptacle.

In operation, the cylinders 112 are filled with fluid 204, thereby extending the piston rod 106 and the bumper 102. Upon impact, the bumper 102 forces the piston rod 106 into the cylinder 112, thereby pressurizing the fluid 204 and forcing the fluid 204 out of the cylinder 112 through the flow restrictor 116.

Figure 2:
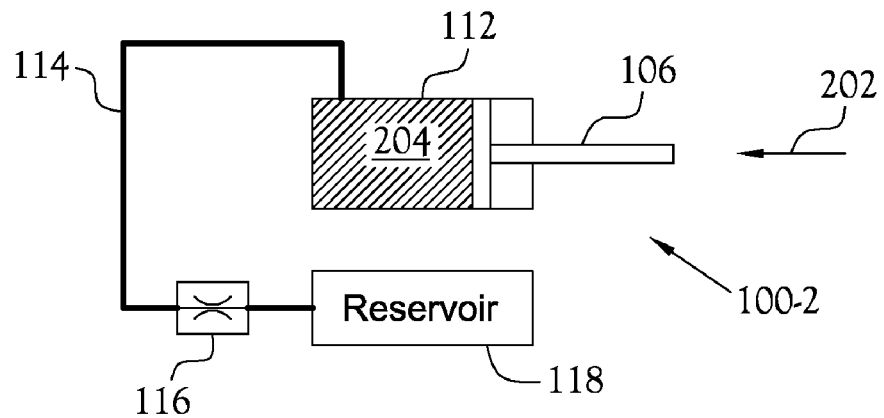
FIG. 2 is a schematic diagram of one embodiment of an impact dispersal system.

FIG. 2 illustrates a simplified schematic diagram of one embodiment of an impact dispersal system 100-2. In the illustrated embodiment, the impact dispersal system 100-2 includes a cylinder 112 with a piston rod 106. The cylinder is connected, by way of tubing 114, to a restrictor, or orifice, 116 that drains into a catch tank, or catch tank, 118. A force 202 applied to the piston rod 106 causes the fluid 204 to be forced out of the cylinder 112. The restrictor 116 limits the flow rate of the fluid 204 out of the cylinder 112, thereby controlling the dispersal rate. A larger sized orifice in the restrictor 116 allows the fluid 204 to exit from the cylinder 112 at a faster rate, whereas a smaller size orifice in the restrictor 116 allows the fluid 204 to exit from the cylinder 112 at a slower rate.

Figure 3:
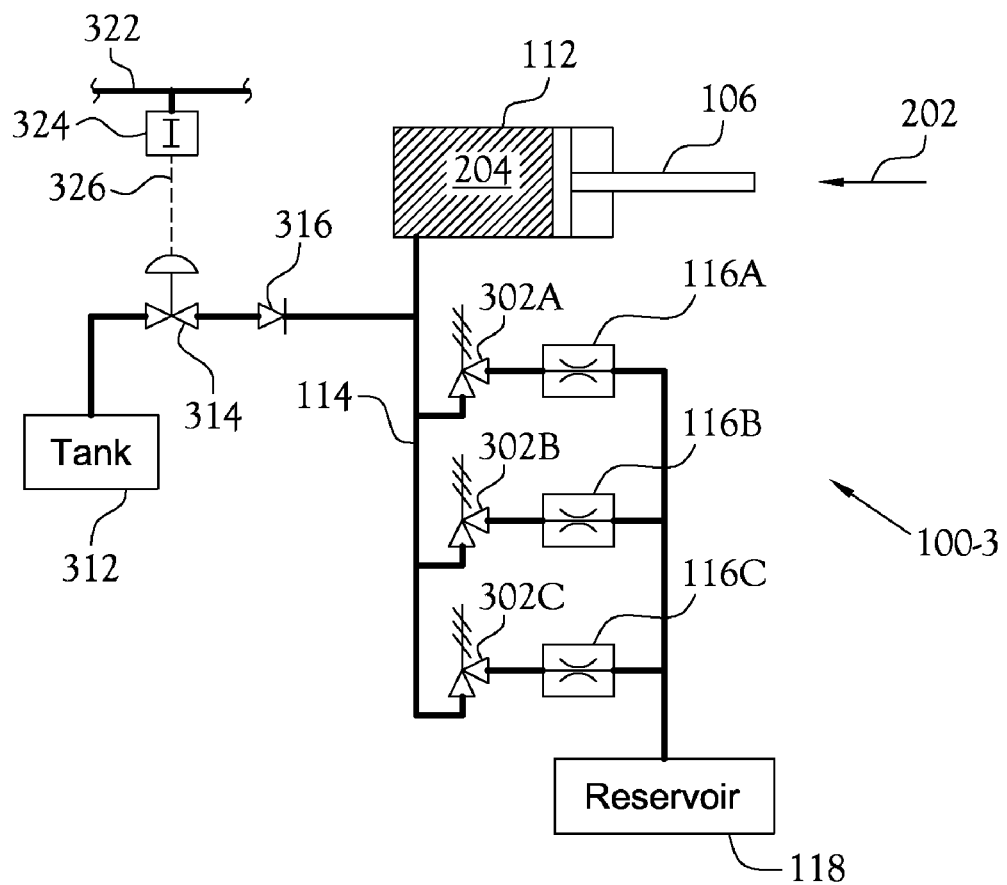
FIG. 3 is a schematic diagram of one embodiment of an impact dispersal system with three levels of dispersal and an automatic extension feature.

The catch tank 118 illustrated in FIGS. 2 and 3 is at atmospheric pressure. The tank 118 is vented such that the flow of fluid 204 into the catch tank 118 is not restricted by any pressure buildup in the tank 118.

FIG. 3 illustrates a schematic diagram of one embodiment of an impact dispersal system 100-3 with three levels of dispersal and with an automatic extension feature. In the illustrated embodiment, the impact dispersal system 100-2 includes a cylinder 112 with a piston rod 106. The cylinder is connected, by way of tubing 114, to a bank of relief valves 302A, 302B, 302C that are each connected to a restrictor 116A, 116B, 116C, respectively. Each of the relief valves 302 has an increasingly higher setpoint. The restrictors 116 drain into the catch tank 118. The illustrated impact dispersal system 100-3 allows for dispersing impacts of varying force. A greater impact results in a higher pressure in the cylinder 112, which causes flow through more of the relief valves 302.

When a force 202 is applied to the piston rod 106, the pressure of the fluid 204 in the cylinder 112 increases until the fluid pressure reaches the setpoint of the first relief valve 302A, which opens, allowing the fluid 204 to pass through the restrictor 116A into the catch tank 118. If the force 202 applied to the piston rod 106 is greater than can be dispersed through the first relief valve 302A, then the fluid pressure will increase further. If the fluid pressure reaches the setpoint of the second relief valve 302B, the second relief valve 302B will open, allowing the fluid 204 to pass through the restrictor 116B into the catch tank 118. If the force 202 applied to the piston rod 106 is greater than can be dispersed through the first and second relief valves 302A, 302B, then the fluid pressure will increase further. If the fluid pressure reaches the setpoint of the third relief valve 302C, the third relief valve 302C will open, allowing the fluid 204 to pass through the restrictor 116C into the catch tank 118. After the fluid pressure decreases below the setpoint of each relief valve 302, the relief valve 302 closes. In this manner, the dispersal rate varies depending upon the amount of force 202 applied to the piston rod 106.

Also illustrated in FIG. 3 is an automatic extension feature that extends the piston rod 106 when the vehicle operator applies the vehicle brake with excessive force, as would be the case when the vehicle operator recognized that a collision is imminent. When the vehicle operator applies the vehicle brakes, the pressure in the brake line 322 increases. The pressure in the brake line 322 increases as the operator applies greater braking force. Connected to the brake line 322 is an isolator 324 that has an impulse line 326 to a pilot operated valve 314 that opens when the impulse pressure increases above a setpoint. A pressurized tank 312 feeds the pilot operated valve 314, which has its outlet passing through a check valve 316 that feeds into the tubing 114 connected to the cylinder 112. The pressurized tank 312 is a vessel that partially contains fluid 204 with the volume of the tank not containing the fluid 204 filled with a pressurized gas. The gas pressurizes the contents of the tank 312, including the fluid 204, and when the valve 314 is opened, the fluid 204 is forced out of the tank 312 by the expanding gas.

The check valve 316 prevents any fluid 204 from the cylinder 112 from flowing back to the tank 312 as a result of an impact dispersed by the system 100-3. When the vehicle operator uses excessive braking force, the pressure in the brake line 322 is transmitted to the impulse line 326 through the isolator 324. The pressure in the impulse line 326, if it is greater than the setpoint of the pilot operated valve 314 causes the pilot operate valve 314 to open, thereby allowing the pressurized fluid in the tank 312 to flow into the cylinder 112 and forcing the piston rod 106 into the extended position. In another embodiment, the valve 314 is a pressure operated valve that is actuated when the pressure in the brake line 322 exceeds a setpoint value.

In this embodiment, the bumper 102, or other impact receiving member, is carried in a retracted position during normal operation. However, when an impact is imminent, as indicated by extreme pressure on the vehicle brakes, the bumper 102, or other impact receiving member, is extended so as to protrude from the vehicle. This allows the full length of travel of the piston rod 106 to be available for impact dispersal. In another embodiment, the valve 314 is opened by some other means, such as a mechanical trip or an electric solenoid, thereby extending the piston rod 106 and readying the impact dispersal system 100-3 for use. Such an embodiment is useful for the application illustrated in FIG. 6.

In various embodiments, the bumper 102 is carried in the fully extended position, partially extended position, or the fully retracted position. With the bumper 102 in the fully extended position, such as the embodiment illustrated in FIG. 1, the impact dispersal system 100-1 is always available for use. With the bumper 102 carried in the partially extended or fully retracted positions, some action is necessary to fully extend the bumper 102 before the bumper 102 is required to disperse an impact. As illustrated in FIG. 3, on such embodiment for extending the bumper 102 immediately before it is required to be available is by using the braking of the vehicle to extend the bumper 102.

In another embodiment, the valve 314 connecting the pressurized tank 312 to the cylinder 112 is actuated by another sensor or switch. For example, in one embodiment, the valve 314 is actuated immediately after an impact is dispersed by the system 100-3, thereby setting up the system 100-3 to be ready for another impact. In one such embodiment, the connection valve 314 is actuated by a limit switch controlled by the position of the piston rod 106.

The impact dispersal system 100-1 illustrated in FIG. 1, in other embodiments, incorporates one or more of the features illustrated in FIG. 3. For example, the discharge line 114 of each cylinder 112A, 112B of the system 100-1 includes a relief valve 302 in series with a flow orifice 116. In another embodiment, the system 100-1 illustrated in FIG. 1 includes a pressurized tank 312 and connecting valve 314.

Figure 4:
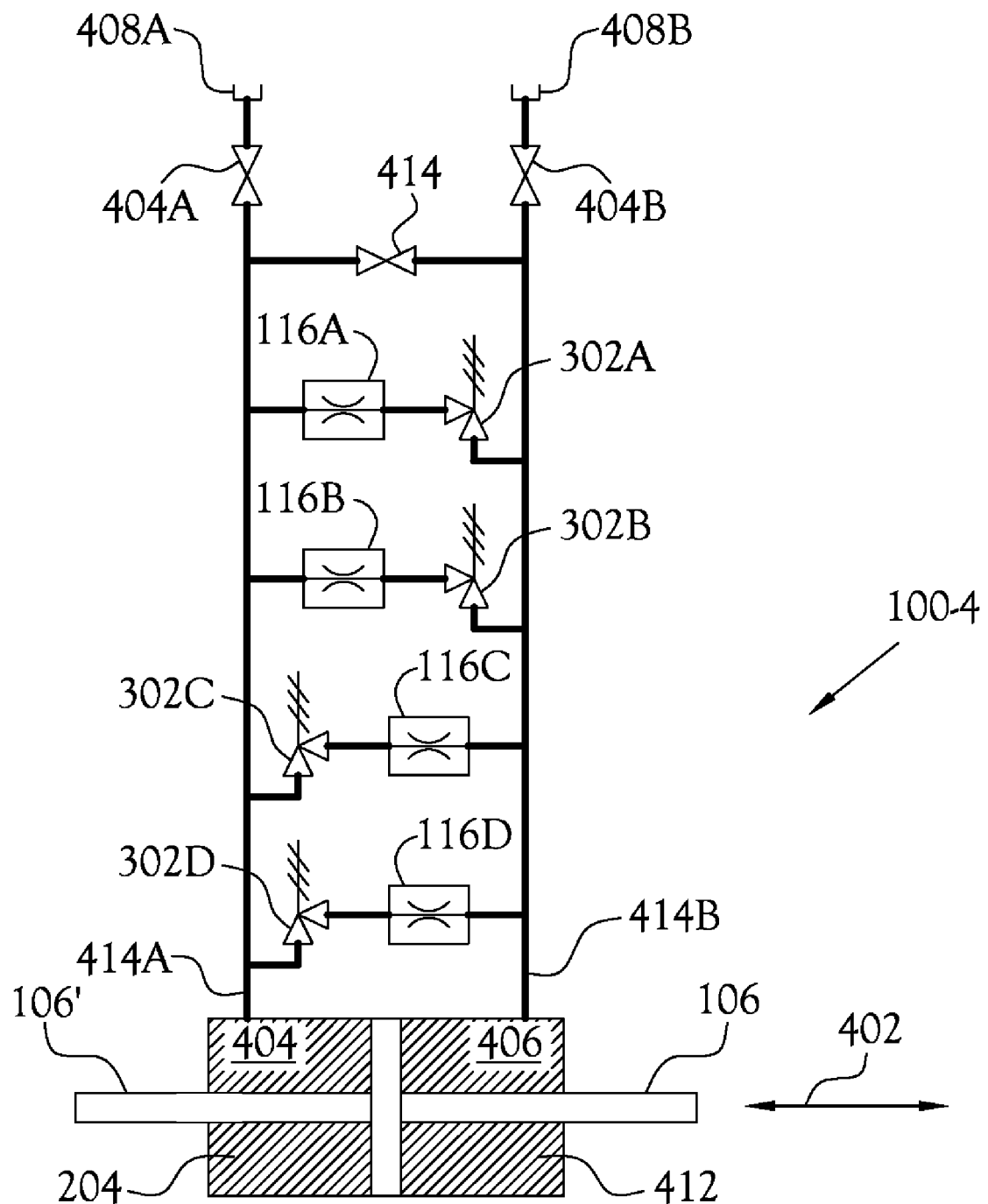
FIG. 4 is a schematic diagram of one embodiment of a two-way impact dispersal system with two levels of dispersal.

FIG. 4 illustrates a schematic diagram of one embodiment of a two-way impact dispersal system 100-4 with two levels of dispersal. A double-acting cylinder 412 has a front piston rod 106 and a rear piston rod 106' with a pair of lines 414A, 414B, each connected to one of the back chamber 404 and the front chamber 406. Connecting the two lines 414A, 414B is a normally closed cross-connect valve 414. The lines 414A, 414B terminate in normally closed valves 404A, 404B that each communicate with a connector 408A, 408B. The arrangement of these three valves 404A, 404B, 414 and connectors 408 allow the cylinder 412 to be positioned and/or charged. The double acting cylinder 412 with the two piston rods 106, 106' has a constant fluid volume for the two chambers 404, 406. That is, the volume of the back chamber 404 and the volume of the forward chamber 406, when added together, is constant regardless of the position of the piston rods 106, 106'. With the constant volume of the two chambers 404, 406, the two-way impact dispersal system 100-4 is a closed system. Those skilled in the art will recognize that the number of relief valves 302 and flow restrictors 116 can vary without departing from the spirit and scope of the present invention.

The double acting cylinder 412 operates in two modes: retracting and extending. A force 402 acting on the piston rod 106 moves the rod 106 in one of two directions. With the direction of the force 402 toward the cylinder 412, the rod 106 retracts, thereby increasing the pressure of the fluid 204, which flows from the contracting back chamber 404, through the tubing 414A to the relief valves 302C, 302D, which are configured similarly to those illustrated in FIG. 3. The relief valves 302C, 302D have different setpoints whereby the second valve 302D, 302C opens only when the force 402 is so great that the pressure cannot be relieved by the first valve 302C, 302D. The discharge from each relief valve 302C, 302D flows through a restrictor 116C, 116D, respectively, and into the expanding, front chamber 406.

With the direction of the force 402 in the opposite direction, away from the cylinder 412, the rod 106 extends, thereby increasing the pressure of the fluid 204 in the forward chamber 406. The fluid 204 flows from the contracting forward chamber 406, through the tubing 414B to the relief valves 302A, 302B, which are configured similarly to those illustrated in FIG. 3. The relief valves 302A, 302B have different setpoints whereby the second valve 302B, 302A opens only when the force 402 is so great that the pressure cannot be relieved by the first valve 302A, 302B. The discharge from each relief valve 302A, 302B flows through a restrictor 116C, 116D, respectively, and into the expanding, back chamber 404.

Figure 5:
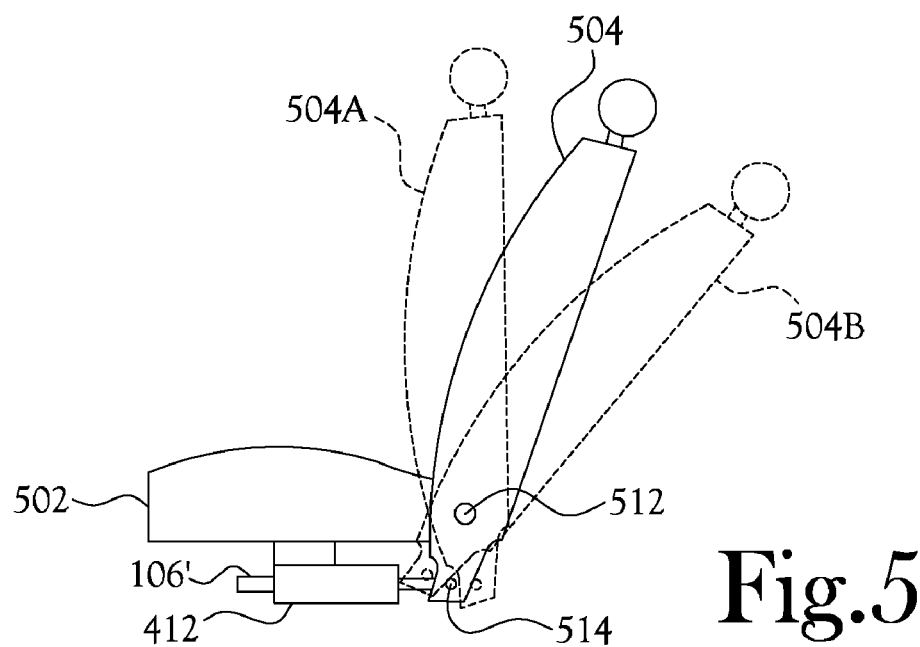
FIG. 5 is a pictorial view of one embodiment of an application of a two-way impact dispersal system.

With the illustrated arrangement of the two-way impact dispersal system 100-4, the system 100-4 provides impact dispersal for impacts that occur in opposite directions. For example, FIG. 5 illustrates a pictorial view of one embodiment of an application of a two-way impact dispersal system 100-4. A vehicle seat 502 has a seat back 504 that, in normal operation, is in a position adjusted for the comfort of the seat occupant. The seat back 504 will tend to move to a forward position 504A or a backward position 504B as result of any impact the vehicle in which the seat 502 is installed undergoes, whether the impact be to the rear or the front of the vehicle. The seat back 504 pivots about a pivoting axis 512 when the seat back 504 is adjusted normally or the seat back 504 moves as a result of an impact. In the illustrated embodiment, a double acting cylinder 412 is fixed to the seat bottom or other member that is normally held in a fixed position relative to the seat back 504 during an impact. The piston rod 106 of the cylinder 412 is attached to a point 514 on the seat back 504 that moves as the seat back 504 moves between its forward and backward positions 504A, 504B.

The seat back 504 is normally constrained to move between a forward and backward position 504A, 504B. During an impact sustained by the vehicle, the two-way impact dispersal system 100-4 is able to disperse impact forces applied in part by the momentum of the occupant of the seat 502. With a seat restraining system secured to the seat back 504 such that the occupant is restrained relative to the seat 502, the momentum of the occupant and the seat back 504 is dispersed by the two-way impact dispersal system 100-4, which is connected to the seat back 504.

In one embodiment, a portion of the shoulder harness of the seat restraining system is secured to the seat back 504. The two-way impact dispersal system 100-4 disperses a portion of an impact to the vehicle from either the front or the rear. Such an impact causes the seat back 504, and the occupant, to move rearward or forward, respectively, with the system 100-4 keeping the head and upper body adjacent the headrest and seat back 204, thereby lessening the risk of head and neck injuries resulting from body recoil.

In one embodiment, stops are provided to limit the movement of the seat back 504 between the forward position 504A and the backward position 504B. The stops are integral with the rod 106 such that the rod 106 is constrained to move only between the stops, thereby limiting the range of motion of the seat back 504. In another embodiment, the stops are integrated with the seat 502 and seat back 504 assembly such that the seat back 504 is constrained to move only between the stops.

Figure 6:
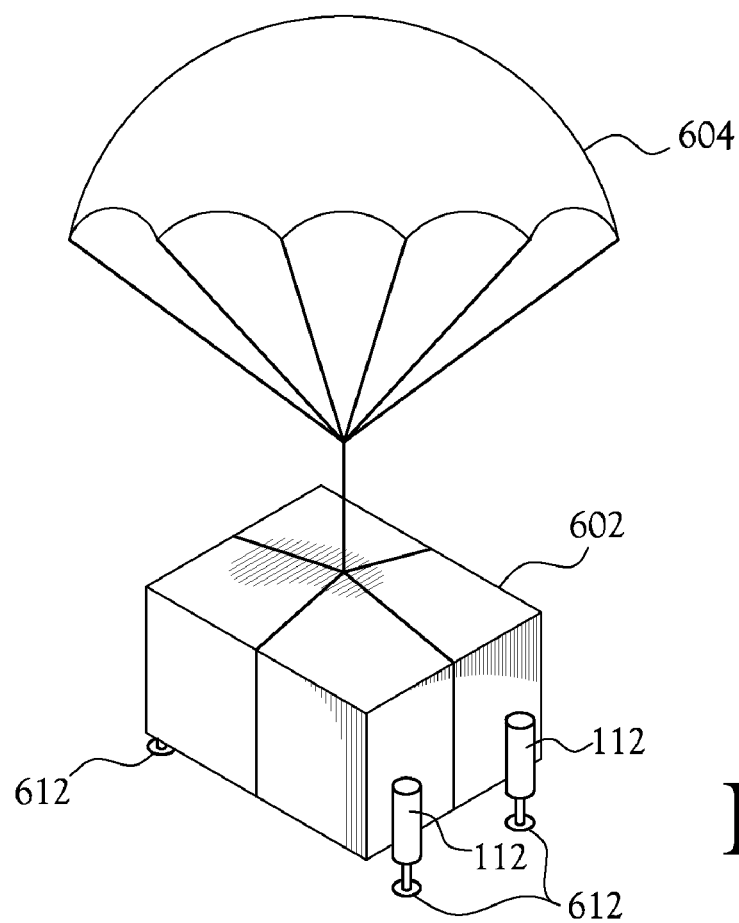
FIG. 6 is a pictorial view of one embodiment of an application of an impact dispersal system.

FIG. 6 illustrates a pictorial view of one embodiment of an application of an impact dispersal system 100. In the illustrated embodiment, a vehicle, such as a carrier or crate, 602 is attached to a parachute 604. The carrier 602 includes a cylinder 112 near each corner. The piston rod 106 of each cylinder 112 has a foot 612 attached. When the object 602 lands, the feet 602 contact the ground and the cause the attached piston rods 106 to retract into the cylinders 112. Each cylinder 112 and foot 612 is independent, thereby facilitating landing the object 602 on uneven surfaces or rough terrain.

In various embodiments, the object 602 is a vehicle, such as a motor vehicle or a crate, dropped from an airplane. In the embodiment in which the carrier 602 is a motor vehicle, the cylinders 112 are attached to the motor vehicle frame or structure. In the embodiment in which the carrier 602 is a crate, the cylinders 112 are attached to the sides of the crate 602, as illustrated. In another embodiment, the cylinders 112 are attached to a skid or pallet with the feet 612 extending below the skid or pallet bottom.

In one embodiment, the piston rods 106 and feet 612 are extended just after the object 602 is dropped from the aircraft. One embodiment includes a rope or other actuator for opening the valve 314, which allows the fluid 204 stored in a pressurized tank to position the piston rods 106 in the cylinders 112 such that the system 100-3 is ready for deployment. After the vehicle 602 is on the ground, the piston rods 106 are retracted, thereby lifting the feet 612 off the ground and allowing the vehicle 602 to be moved. In one embodiment of the impact dispersal system 100, the system 100 discharges the fluid 204 to the atmosphere and not into a catch tank 118. In this embodiment, the fluid 204 is a bio-degradable or otherwise benign fluid. Because the illustrated embodiment depicts a single-use system, the fluid 204 does not need to be retained and environmental friendly fluids will not contaminate the ground.

In another embodiment, the impact dispersal system 100 illustrated in FIG. 6 includes a fixed orifice or restrictor 116 and a fixed setpoint pressure relief valve 302. The size of the restrictor 116 and the setpoint of the valve 302 are determined based on the characteristics of the object 602, such as weight, rate of descent, and weather conditions.

Figure 7:
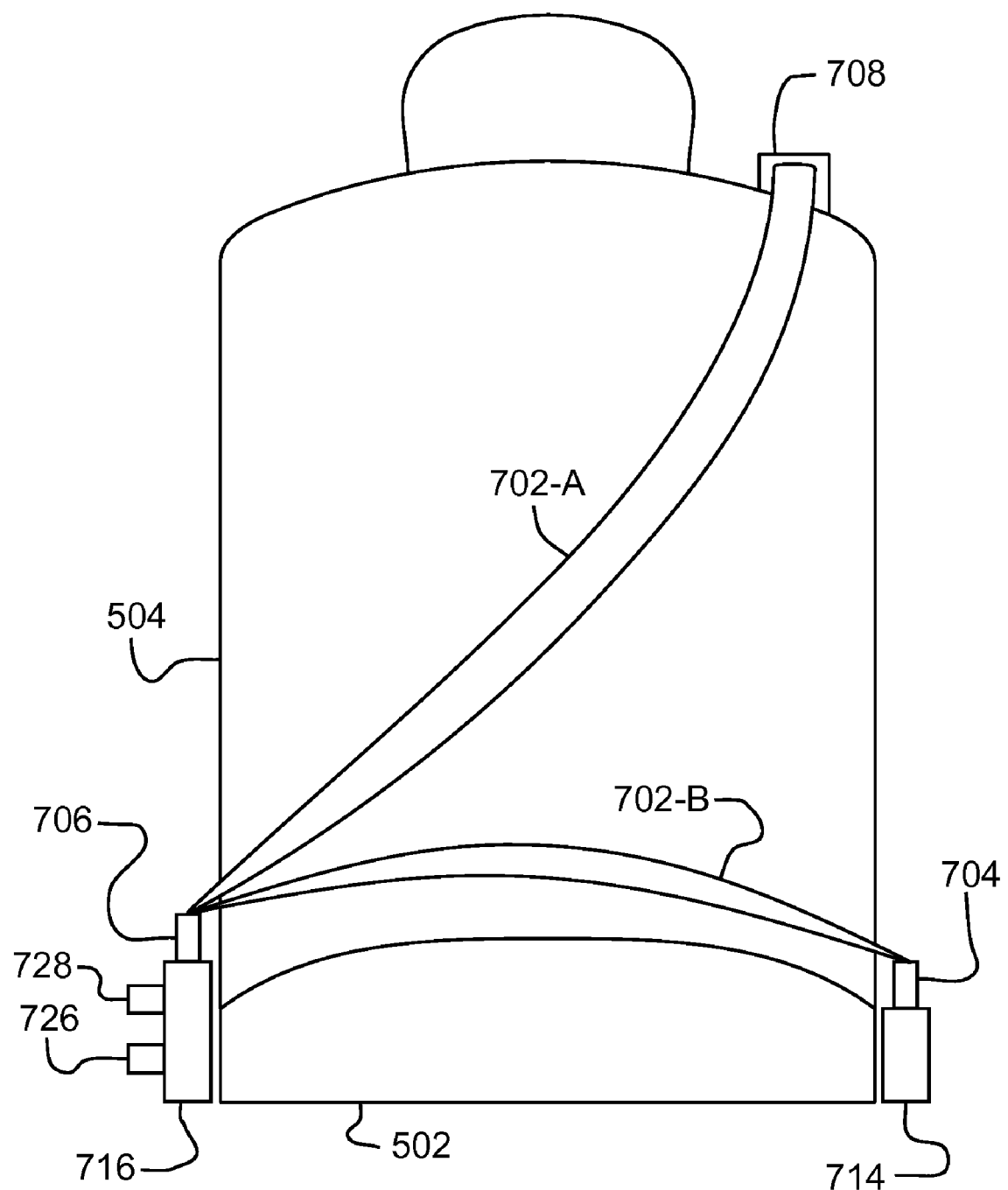
FIG. 7 is a front view of a seat employing the two-way impact dispersal system shown in FIG. 5.

FIG. 7 illustrates a front view of a vehicle seat 502 and seat back 504 of the embodiment of the application employing the two-way impact dispersal system 100-4 shown in FIG. 5. As described above, the seat back 504 moves between a forward position 504A and a backward position 504B. It is known to have the shoulder harness portion of a seat belt of a vehicle attached to the vehicle, such as on the support column adjacent the door. With the seat harness attached to a fixed point and the seat back 504 moving between two positions 504A, 504B, the passenger occupying the seat 502 will experience a too tight seat harness and a too loose seat harness, respectively. The embodiment illustrated in FIG. 7 overcomes the relative movement between the seat back 504 and the seat harness 702A.

Adjacent one side of the seat 502 is a seat belt mount 714 with bracket 704 to which one end of the seat belt 702 is attached. A portion of the seat belt 702B crosses over the seat 502 and is adapted to lie adjacent the lap of the passenger occupying the seat 502. The seat belt 702 passes through a seat belt latch tongue 706, which clips into the seat belt latching mechanism 716. The seat belt latching mechanism 716 includes a seat belt release button 726, which in the illustrated embodiment is shown on the side of the latching mechanism 716. Those skilled in the art will recognize that the release button 726 can be located at other positions on the latching mechanism 716 without departing from the spirit and scope of the present invention. The upper end of the shoulder portion 702A of the seat belt 702 connects to the seat belt retractor 708. The seat belt retractor assembly 708 coils the excess length of the seat belt 702 to allow the seat belt 702 to fit snugly against the passenger occupying the seat 502. The seat belt retractor assembly 708 also includes a locking mechanism that prevents the seat belt 702 from being released from the retractor assembly 708 when the seat belt 702 is needed to restrain the passenger occupying the seat 502 during a collision or impact to the vehicle.

In the illustrated embodiment, the seat belt retractor 708 is attached to the seat back 504 with structural support to withstand the forces encountered by the seat harness system during an accident. Because the seat belt retractor 708 is in a fixed position relative to the seat back 504, the shoulder portion 702A of the seat belt 702 maintains its pre-determined position with respect to the passenger occupying the seat 502 during an accident or when the seat harness system is otherwise required.

Figure 8:
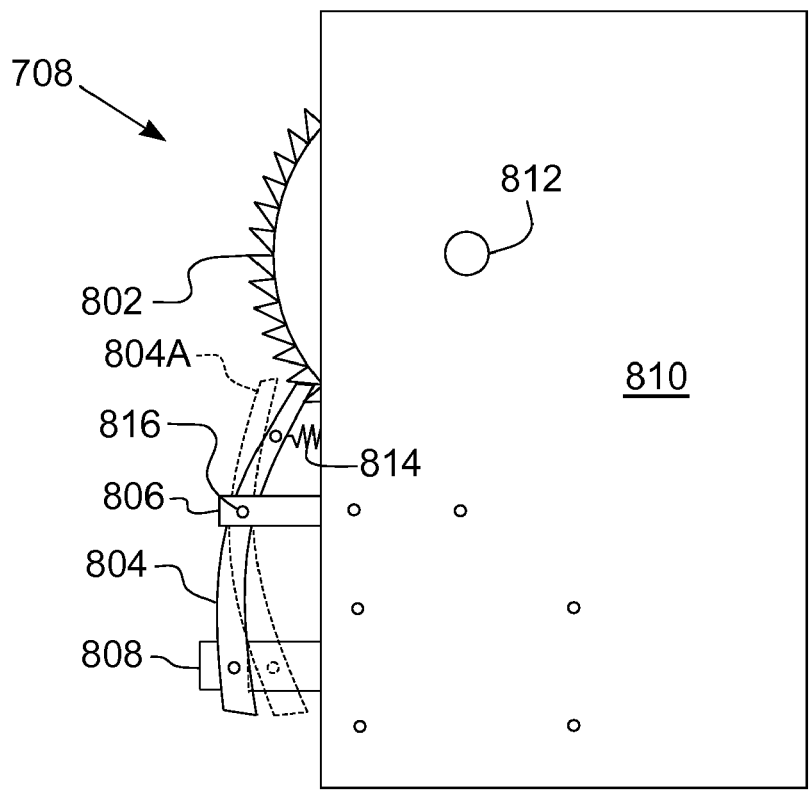
FIG. 8 is a side view of one embodiment of a seat belt harness retractor and lock assembly.
Figure 9:
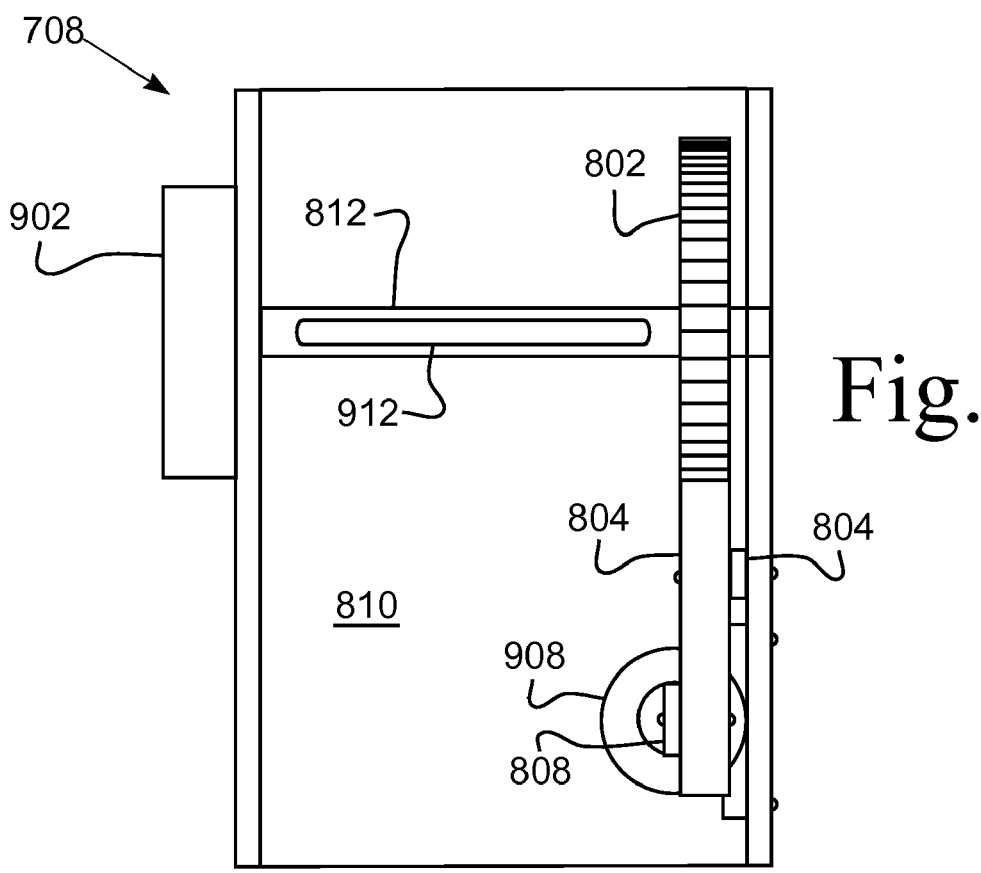
FIG. 9 is a front view of the seat belt harness retractor assembly shown in FIG. 7.

FIG. 8 illustrates a side view of one embodiment of a seat belt harness retractor assembly 708. FIG. 9 illustrates a front view of the seat belt harness retractor assembly 708 shown in FIG. 7. The retractor assembly 708 includes a rotating shaft 812 about which the excess length of the seat belt 702 winds for storage. The shaft 812, in the illustrated embodiment, has a slot 912 that receives the end of the belt 702. The shaft 812 is connected to a coil spring 902 that provides the winding force.

As an alternative to the automatic locking mechanisms used in the seat belt retractors 708, the illustrated embodiment includes a pawl 804 that selectively engages a toothed wheel 802 to lock the wheel 802 and the shaft 812 in a fixed position. The pawl 804 pivots about a pin 816 in a support member 806 attached to the retractor housing 810. One end of the pawl 804 is attached to an actuator shaft 808 that is selectively extended and retracted from an actuator 908, thereby causing the opposite end of the pawl 804 to engage and disengage from the toothed wheel 802. The disengaged position of the pawl 804A is illustrated in FIG. 8 with broken lines. Near the end of the pawl 804 adjacent the toothed wheel 804 is a spring 814 held in tension. The spring 814 pulls the pawl 804 toward the wheel 802 and forces the pawl 804 to engage the wheel 802. Those skilled in the art will recognize that the spring 814 can be of other types, such as a torsion spring, without departing from the spirit and scope of the present invention.

In one embodiment, the pawl 804 moves between the engaged and disengaged positions solely through the movement of the actuator shaft 808. In another embodiment, a spring 814 attached to the housing 810 acts on the pawl 804 to force the pawl 804 into the engaged position. Such a spring 814, in one embodiment, is a torsion spring that forces the pawl 804 into the engaged position. In the illustrated embodiment, a coil spring 814 is attached to the pawl 804 near the toothed wheel 802, thereby forcing the pawl 804 into the engaged position. With the pawl 804 forced into the engaged position, actuation of the actuator shaft 808 pulls the opposite end of the pawl 804 down, thereby unlocking the toothed wheel 802 and allowing adjustment of the seat belt 702.

In one embodiment, a locking button 728 is mounted on the seat belt retractor assembly 708. The locking button 728 operates the actuator 908 to move the pawl 804 to the disengaged position 804A. In one embodiment, the locking button 728 is an electrical switch that is connected to the actuator 908, which is a solenoid. In another embodiment, the locking button 728 is connected to a cable that causes the actuator shaft 808 to move. In either embodiment, the button 728 allows the passenger in the seat 502 to have freedom of movement unrestrained by the belt 702 with the push of a pushbutton 728.

Figure 10:
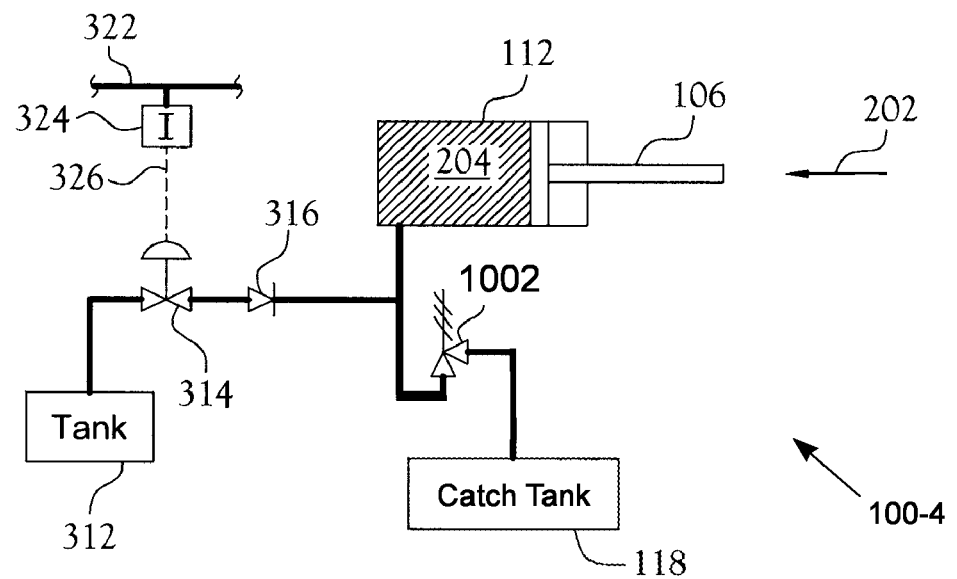
FIG. 10 is a schematic diagram of another embodiment of an impact dispersal system with a multi-level dispersion valve.

FIG. 10 illustrates a schematic diagram of another embodiment of an impact dispersal system 100-4 with a multi-level or variable dispersion valve 1002. The illustrated embodiment of the system 100-4 is similar to the embodiment illustrated in FIG. 3 except the three relief valves 302A, 302B, 302C, each with a single setpoint, and the three associated flow restrictors 116A, 116B, 116C are replaced with a single dispersion valve 1002 that has a first setpoint where the valve 1002 first opens and then has a variable flow rate until the valve is submitted to a pressure where the valve is fully open. In the illustrated embodiment, as the piston rod 106 moves due to an impact 202, the pressure of the fluid 204 increases. As the pressure increases to the first setpoint, the dispersion valve 1002 opens allowing fluid 204 to be released to the catch tank 118 at a pre-determined flow rate. If the pressure in the cylinder 112 continues to increase to the second setpoint of the valve 1002, the dispersion valve 1002 allows a greater flow rate of fluid 204 to be released from the cylinder 112 to the catch tank 118. In another embodiment, the valve 1002 has a variable flow rate directly related to the pressure of the fluid 204 at the inlet to the valve 1002.

Figure 11:
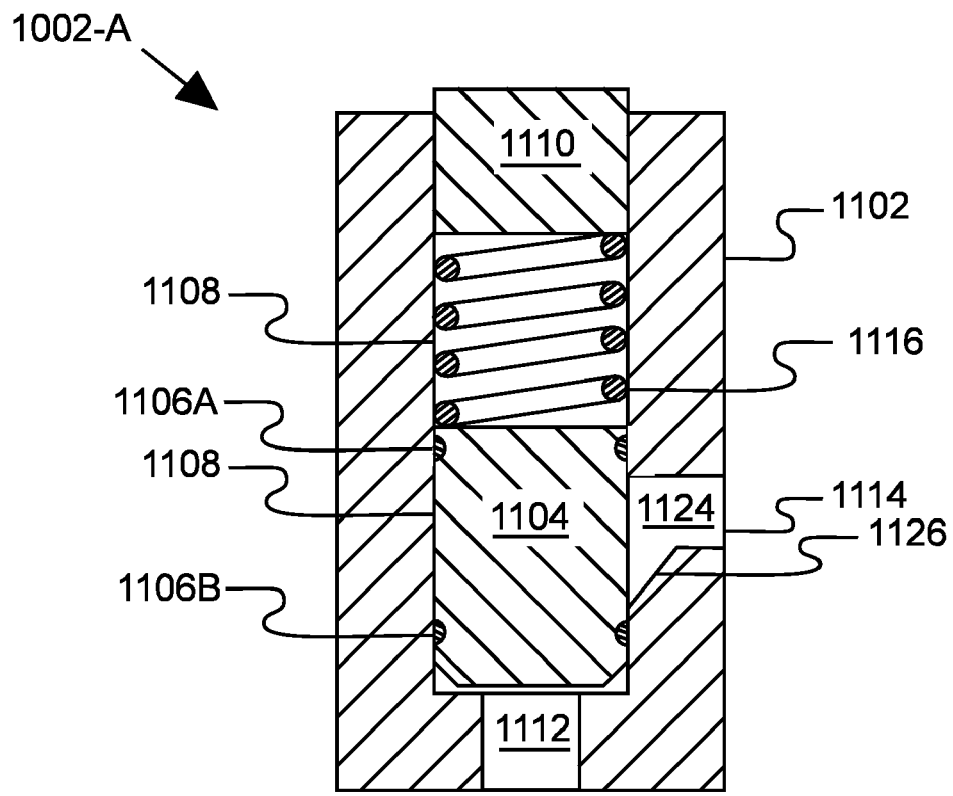
FIG. 11 is a cross-sectional view of one embodiment of a dispersion return valve with a variable rate of relief.

FIG. 11 illustrates a cross-sectional view of one embodiment of a dispersion return valve 1002-A with a variable setpoint. The illustrated variable dispersion return valve 1002-A is a direct acting piston valve. The piston 1104 moves within a bore 1108 of the valve body 1102 with the position of the piston 1104 related to the pressure of a fluid at the inlet port 1112. A lower o-ring 1106B is positioned between the piston 1104 and the surface of the bore 1108 in the valve body 1102, and an upper o-ring 1106A is positioned on the piston 1104 proximate the spring 1116. A spring 1116 between the piston 1104 and a plug 1110 in the valve body 1102 counteracts the force of the fluid applied to the lower face of the piston 1104. The plug 1110, in one embodiment, has a threaded engagement with the valve body 1102 in which the plug 1110 position relative to the bottom of the bore 1108 in the valve body 1102 is adjustable, thereby changing the force applied to the piston 1104 by the spring 1116. In another embodiment, the plug 1110 is fixed in position in the valve body 1102 such that the spring 1116 applies a preselected force to the piston 1104.

The outlet port 1114 of the valve 1002-A has a central bore 1124 with a slot 1126 positioned towards the inlet port 1112. As the pressure of the fluid increases, causing the piston 1104 to move up, when the pressure reaches the first setpoint the slot 1126 is exposed to the fluid from the inlet port 1112, thereby allowing the fluid to pass through the valve 1002-A at a rate based on the cross-sectional area of the slot 1126 exposed by the piston 104. If the pressure continues to increase, the piston 1104 continues to move up, thereby exposing more of the area of the slot 1126 until the piston exposes the main outlet bore 1124 when the second setpoint is reached. In the illustrated embodiment, the slot 1126 is slanted such that, as the piston 1104 moves upward, a greater volume of fluid flows into the slot 1126. Those skilled in the art will recognize that the angle and shape of the slot 1126 can vary without departing from the scope and spirit of the present invention. As the main outlet bore 1124 is exposed by the piston 1104 moving up, the rate of flow from the inlet port 1112 to the outlet port 1114 increases. In one embodiment, the slot 1126 is a channel in the valve body 1102. In another embodiment, the slot 1126 is formed by a tapered end mill that cuts a groove in the surface of the bore 1108. In the illustrated embodiment, the bottom of the slot 1126 is elevated above the seat of the inlet port 1112. In other embodiments the slot 1126 is positioned to be exposed as soon as the piston 1004 becomes unseated, allowing fluid to flow from the inlet port 1112 through the slot 1124 to the outlet port 1114.

In the illustrated embodiment, the valve 1002-A has a first setpoint associated with initially exposing the slot 1126, a second setpoint associated with exposing the main outlet bore 1124, and a high setpoint associated with having the maximum area of the main outlet bore 1124 exposed. The outlet port 1114 is a staged outlet port because of the slot 1126 and the main outlet bore 1124 allow the flow rate through the outlet port 1114 to vary by stages. That is, the first stage of the illustrated embodiment begins when the piston 1104 exposes the slot 1126, thereby allowing fluid to flow through the valve in relation to the amount of the slot 1126 exposed by the piston 1104 movement. The second stage begins when the piston 1104 exposes the main bore 1124, thereby allowing a greater flow rate through the valve 302'.

In various embodiments, the shape, size, and location of the slot 1126 is configured to obtain the number of setpoints desired and the flow rate at and between each of those setpoints. The slot 1126 and main outlet bore 1124 act as a variable flow restrictor, with the amount of flow restriction being a function of the exposed area and the position of the piston 1104 based on the fluid pressure. In another embodiment, the two sets of relief valves 302 and flow restrictors 116 illustrated in FIG. 4 are replaced with a pair of multiple setpoint dispersion valves 1002, with each valve 1002 discharging to one of the chambers 404, 404.

FIG. 12 illustrates a schematic diagram of another embodiment of an impact dispersal system 100-5 with an automatically extending feature. The illustrated embodiment of the system 100-5 is similar to the embodiment illustrated in FIG. 10 except a single, pressurized reservoir 1204 is used instead of a separate tank 312 and catch tank 118. The pressurized reservoir 1204 contains a fluid 204 that is used to fill the cylinder 112 to extend the piston rod 106 when the valve 314 is opened by pressure applied to line 326. The check valve 316 prevents the fluid 204 in the cylinder 112 from flowing back into the reservoir 1204.

The cylinder 112 includes a piston 1206 that is pushed through the cylinder 112 either by fluid 204 filling the cylinder 112 or by the piston rod 106 when an impact force 202 is applied. The piston 1206 is sealed in the cylinder 112 to ensure that the fluid 204 is pushed out of the cylinder 112 when the piston 1206 slides within the cylinder 112. In one embodiment, one or more metal piston rings 1208 provide the seal for the piston 1206. A metal piston ring 1208 has the strength and rigidity to withstand the high pressures generated from an impact force 202. In one embodiment, a resilient o-ring is positioned adjacent the metal piston ring 1208 on the piston 1206. The o-ring prevents seepage and static leaking, while the metal piston ring 1208 prevents the high pressure from blowing out the seal.

Upon an impact, a force 202 causes the piston rod 106 to pressurize the fluid 204 in the cylinder 112. When the pressure of the fluid 204 reaches the setpoint pressure of the variable valve 1002, the variable valve 1002 actuates, thereby allowing the fluid 204 in the cylinder 112 to flow back into the reservoir 1204.

The reservoir 1204 has a dispersion valve 1202 that prevents the pressure in the reservoir 1204 from exceeding a set value. The reservoir 1204 is maintained at a low pressure sufficiently high so that when the valve 314 is actuated, fluid 204 in the reservoir 1204 will flow into the cylinder 112. The dispersion valve 1202 has a set point that is greater than the pressure normally maintained in the reservoir 1204. When the variable valve 1002 is actuated, high pressure fluid 204 from the cylinder 112 enters the reservoir 1204 and has the potential to cause a pressure spike in the reservoir 1204 that could impede the flow of fluid 204 into the reservoir 1204. The dispersion valve 1202 ensures that the maximum pressure in the reservoir 1204 is limited.

The illustrated impact dispersal system 100-5 is suitable for use when it is desired to have the piston rod 106 in a retracted position during normal operation and to have the system 100-5 available for impacts that are detectable immediately before they occur. For example, the system 100-5 is suitable for aircraft landing gear and for aircraft seats. The valve 314, in various embodiments, is operated by fluid pressure or by an electrical signal. In one embodiment, the valve 314 actuates upon loss of pressure or electric signal, such as may occur when vital vehicle systems are lost. It is in these circumstances when the impact dispersal system 100-5 is most likely to be required to be in service with the piston rod 106 fully extended for maximum stroke in the cylinder 112.

FIG. 13 illustrates a cross-sectional view of another embodiment of a variable dispersion valve 1002-B. The valve 1002-B is illustrated in a partially actuated position with the ball 1310 lifted from the seat 1312, thereby connecting the inlet port 1112 to the outlet port 1114. The outlet port 1114 has a bore 1124' that is cylindrical with a bottom edge that is substantially collinear with the top of the seat 1312. In another embodiment, the bore 1124' includes a slot 1126, 1126', such as the ones illustrated in FIGS. 11 and 15.

The illustrated valve 1002-B has a two section body 1302, 1304. In another embodiment, the valve 1002-B is a one-piece body. The lower section 1302 has a wall thickness sufficient to withstand the operating pressure of the fluid 204. The upper section 1304 has thinner walls and houses the spring 1116, which is retained by the plug 1110. The two sections 1302, 1304 are secured together with a plurality of fasteners 1306. The piston 1104' has an o-ring 1106C that isolates the fluid 204 in the lower section 1302 near the seat 1312 from the upper section 1304 where the biasing spring 1116 is located.

The piston 1104' slides within a bore 1108. Within the piston bore 1108 between the piston 1104' and the plug 1110 is a stop pin 1308, which is surrounded by the spring 1116. In the illustrated embodiment, the stop pin 1308 is attached to the piston 1104', but in other embodiments the pin 1308 is attached to the plug 1110 or otherwise retained within the piston bore 1108. The stop pin 1308 prevents the piston 1104' from being forced too far towards the plug 1110 and limits the travel of the piston 1104' within the piston bore 1108. In one embodiment, the end of the spring 1116 fits into a recess in the piston 1104', thereby allowing the height of the valve 1002-B to be reduced.

In operation, the variable dispersion valve 1002-B has a setpoint determined by the spring 1116. When the pressure of the fluid 204 in communication with the inlet port 1112 exceeds the setpoint, the piston 1104' lifts the ball 1310 from the seat 1312, thereby allowing the fluid 204 to flow to the outlet port 1114. If the fluid pressure is sufficiently high, the piston 1104' compresses the spring 1116 further and also exposes more of the outlet bore 1124' to the fluid 204 from the inlet port 1112. As the piston 1104' moves away from the seat 1112, the flow rate through the valve 1102-B increases. If the fluid pressure is too great, the piston 1104' moves through the bore 1108 until the piston 1104' travel is stopped by the stop pin 1308.

Figure 14:
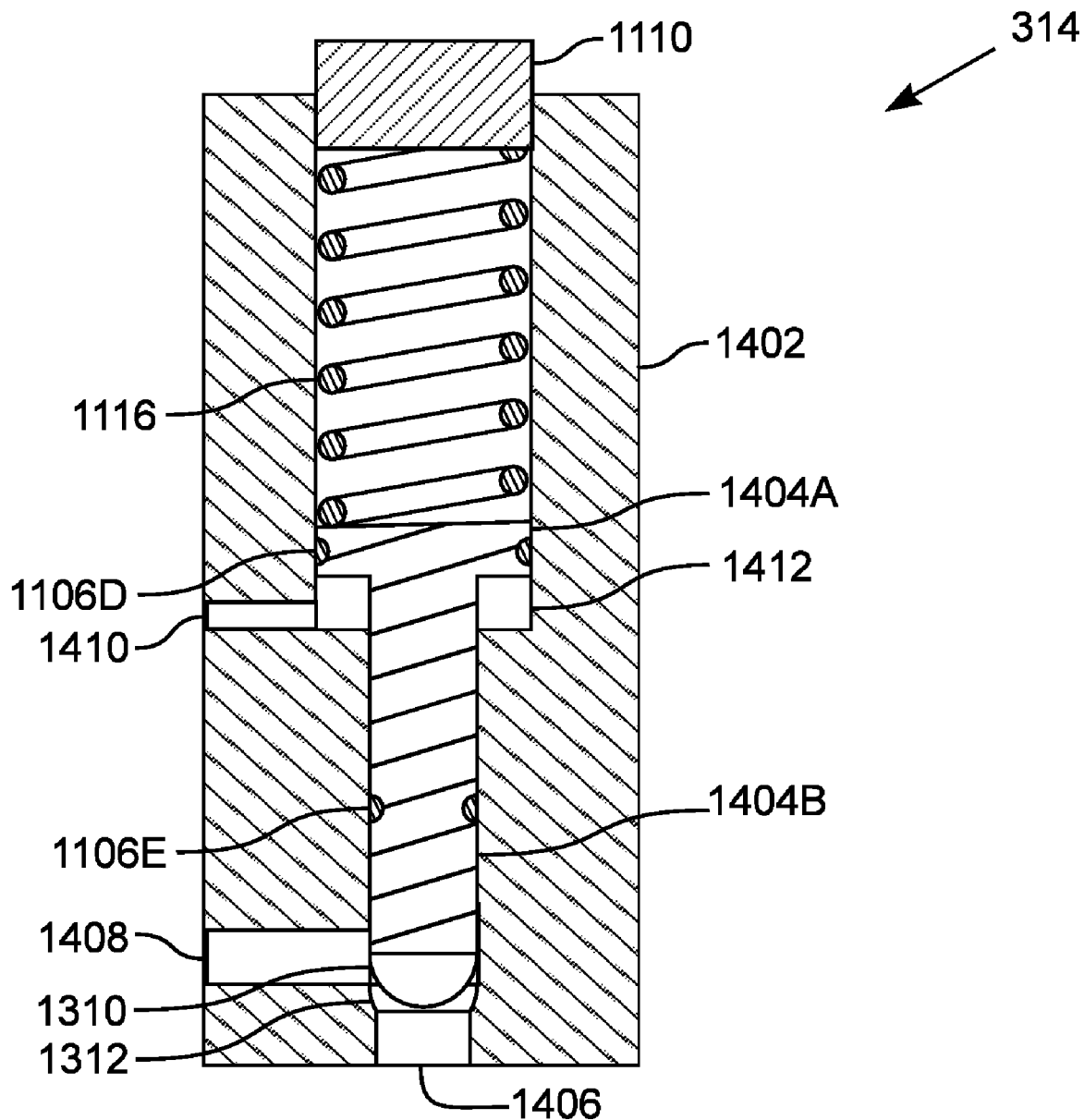
FIG. 14 is a cross-sectional view of one embodiment of a pressure actuating valve.

FIG. 14 illustrates a cross-sectional view of one embodiment of a pressure actuating, or extension, valve 314. The valve 314 has a body 1402 with an inlet port 1408, an outlet port 1406, and an actuating port 1410. The valve 314 is illustrated in a partially actuated position with the ball 1310 lifted from the seat 1312, thereby connecting the inlet port 1408 to the outlet port 1406.

The piston 1404 has a wide portion 1404A and a narrow portion 1404B. Each portion of the piston 1404A, 1404B has an o-ring 1106D, 1106E that seals the piston 1404 within a cavity in the body 1402. The distal end of the narrow portion 1404B includes a ball 1310 that engages a seat 1312.

The wide portion 1404A of the piston 1404 defines a cavity 1412 that communicates with the actuating port 1410. A pressurizing fluid entering the actuating port 1410 fills the cavity 1412 and forces the wide portion 1404A of the piston 1404 against the spring 1116. As the piston 1404 moves from the force of the pressurizing fluid, the ball 1310 moves away from the seat 1312, thereby allowing the fluid from the inlet port 1408 to flow to the outlet port 1406.

The force applied by the spring 1116 against the wide portion 1404A of the piston 1404 determines the amount of pressure that needs to be applied by the pressurizing fluid in the actuating port 1410 to lift the ball 1310 from the seat 1312. The plug 1110, in one embodiment, is threaded into the body 1402 and is adjusted to control the spring force applied to the piston 1404.

Referring to FIG. 12, the actuating port 1410 is in fluid communication with line 326. Pressure from the fluid in line 326 actuates the valve 314, which connects the inlet port 1408 to the outlet port 1406 and allows the fluid 204 to flow from the reservoir 1204 to the cylinder 112. With the valve 314 actuated, the cylinder 112 is filled with fluid 204 and the piston rod 106 is extended.

Figure 15:
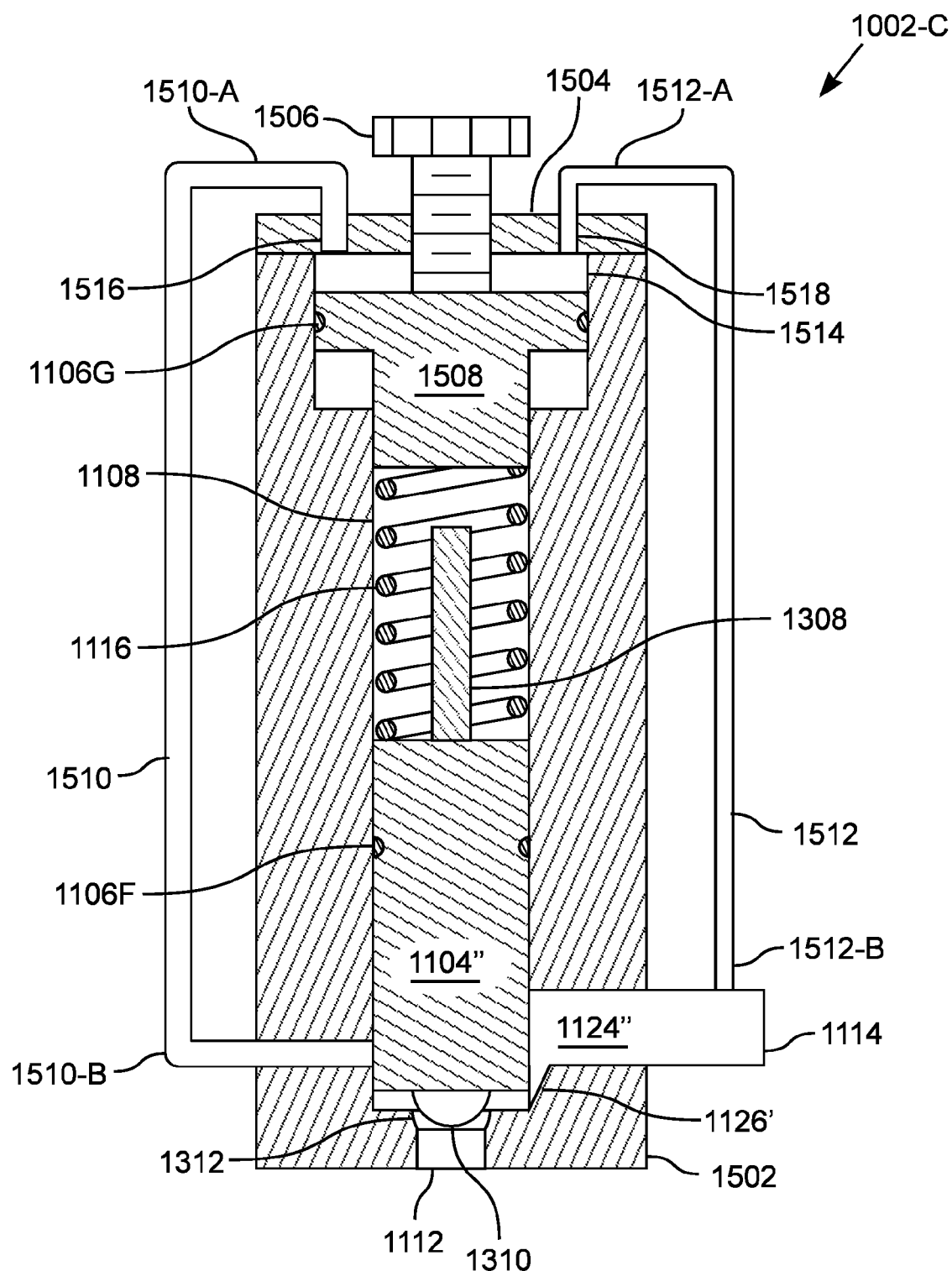
FIG. 15 is a cross-sectional view of still another embodiment of a variable dispersion return valve.

FIG. 15 illustrates a cross-sectional view of still another embodiment of a variable dispersion return valve 1002-C. The valve 1002-C is illustrated in a partially actuated position with the ball 1310 lifted from the seat 1312, thereby beginning to connect the inlet port 1112 to the outlet port 1114. The outlet port 1114 has a bore 1124" that is cylindrical except for the connection to the first bore 1108, which includes a slot 1126' that has a bottom edge that is substantially coplanar or in-line with the bottom of the bore 1108 or with the top of the seat 1312. The flow through the valve 1002-C is determined by the distance the first piston 1104" moves away from the seat 1312. The flow increases as the piston 1104" uncovers a greater portion of the slot 1126' and the bore 1124". In another embodiment, the outlet bore 1124" is cylindrical as illustrated in the outlet bore 1124' shown in FIG. 13.

The illustrated variable dispersion return valve 1002-C has a one-piece body 1502 with a cap 1504. In another embodiment, the valve 1002-C has a two-piece body such as illustrated in FIG. 13. The body 1502 has a first bore 1108 that contains a first piston 1104" and a spring 1116. The distal end of the first piston 1104" has a ball 1310 that engages a seat 1312. The other end of the first piston 1104" engages the spring 1116. The piston 1104" has an o-ring 1106F that isolates the fluid 204 near the seat 1312 from where the biasing spring 1116 is located.

The first piston 1104" slides within the bore 1108. Within the piston bore 1108 adjacent the spring 1116 is a stop pin 1308. In the illustrated embodiment, the stop pin 1308 is attached to the first piston 1104", but in other embodiments the pin 1308 is attached to the return piston 1508 or otherwise retained within the piston bore 1108. The stop pin 1308 prevents the first piston 1104" from being forced too far away from the seat 1312 and limits the travel of the first piston 1104' within the piston bore 1108. In one embodiment, the stop pin 1308 has a length sufficient to engage the return piston 1508 such that, with the return piston 1508 at its extreme end of travel, the seat end of the first piston 1104" blocks the inlet end 1510-B of the first tube 1510 but does not completely block the outlet bore 1124", including the slot 1126'. In such an embodiment, the first piston 1104" has a stroke that extends to the upper portion of the outlet bore 1124'.

On the opposite side of the spring 1116 from the first piston 1104″ is the return piston 1508. An adjustment bolt 1506 engages the cap 1504 and contacts the return piston 1508. The adjustment bolt 1506 determines the compression of the spring 1116, which determines the operating setpoint for the valve 1002-C. The return piston 1508 has a wide portion that slides within a cavity 1514 and a narrow portion that slides within the bore 1108. The return piston 1508 is sealed in its cavity 1514 with an o-ring 1106G. Between the return piston 1508 and the cap 1504 is the cavity 1514 that is in fluid communication with the bore 1108 adjacent the seat 1310 and is also in fluid communication with the outlet port 1114.

In the illustrated embodiment, a first tube 1510 has one end 1510-A connected to the cavity 1514. The end 1510-A has an orifice 1516 where it connects with the cavity 1514. The other end 1510-B of the first tube 1510 is connected to the bore 1108 adjacent the seat 1312. As the first piston 1104″ moves within the bore 1108, the inlet port 1112 is first in fluid communication with the slot, or ramp, 1126′ of the bore 1124′ for the outlet port 1114 and then the inlet port 1112 is in fluid communication with the first tube 1510. The inlet end 1510-B of the first tube 1510 is offset from the seat 1312 sufficiently to provide a delay in the pressurized fluid reaching the first tube 1510 and pressuring the cavity 1514 for the return piston 1508. That is, the pressure at the inlet port 1112 causes the first piston 1104′ to move, which causes fluid to first flow through the slot 1126′ and through the outlet port 1114. If the pressure is sufficiently high, the first piston 1104′ will continue to move away from the seat 1312 until the inlet end 1510-B of the first tube 1510 is uncovered by the first piston 1104′. In one embodiment, the cavity 1514 above the return piston 1508 contains air at atmospheric pressure. The fluid flowing from the first tube 1510 into the cavity 1514 must first compress the air before sufficient pressure is available to push the return piston 1508 toward the first piston 1104″. The compression of the air serves to increase the delay before the return piston 1508 starts moving.

A second tube 1512 has one end 1512-A connected to the cavity 1514. The end 1512-A has an orifice 1518 where it connects with the cavity 1514. The other end of the second tube 1512 is connected to the outlet port 1114. As the first piston 1104″ moves within the bore 1108, the inlet port 1112 is in fluid communication with the outlet port 1114, which puts the inlet port in fluid communication with the second tube 1512.

Referring to FIG. 12, in operation, the fluid 204 from the cylinder 112 is pressurized by the force 202 from an impact. The fluid 204 pressurizes the inlet port 1112 of the valve 1002-C. If the pressure is greater than the setpoint of the valve 1002-C, the first piston 1104″ compresses the spring 1116 and the ball 1310 lifts from the seat 1312. As soon as the first piston 1104″ moves the ball 1310 off the seat 1312, fluid flows through the slot 1126′ out the outlet port 1114. If the pressure at the inlet port 1112 is sufficiently high, the first piston 1104″ moves to uncover the port 1510-B for the first tube 1510, which causes the cavity 1514 to be pressurized. Because the area of the wide portion of the return piston 1508 is greater than the area of the first piston 1104″, a greater force is generated at the return piston 1508 than at the first piston 1104″, thereby causing the first piston 1104″ to force the ball 1310 toward the seat 1312. If the pressure is sufficiently high, the piston 1104″ will move until the stop pin 1308 engages the return piston 1508. In one embodiment, the stop pin 1308 engages the return piston 1508 before the return piston 1508 moves to the end of its travel in the cavity 1514. With the stop pin 1308 engaging the return piston 1508, as the return piston 1508 is forced down by the pressure from the fluid that enters the inlet end 1510-B of the first tube 1510, the first piston 1104″ is forced toward the seat 1312. The return piston 1508 has a maximum travel such that the first piston 1104″ is forced toward the seat 1312 and covers the inlet end 1510-B of the first tube 1510 while fluid continues to flow from the inlet port 1112 through the slot 1126′ and the bore 1124″. At this position of the return piston 1508, the force from the spring 1116 is the only force pushing the first piston 1104″ toward the seat 1312. Fluid will continue to flow and the pressure will be relieved as long as the pressure is sufficient to overcome the spring force.

Because the second tube 1512 connects the cavity 1514 to the outlet port 1114, which is typically at a lower pressure than the inlet port 1112, the pressure in the cavity 1514 is continually bled down. In one embodiment, the second tube 1512 has a restricting orifice 1518 located at the cap 1504. The restricting orifice 1518 limits the flow through the second tube 1512. In another embodiment, the second tube 1512 is sized to allow less flow than the first tube 1510. Accordingly, when pressure is applied to the cavity 1514 by the first tube 1510, the second tube 1512 does not have sufficient capacity to prevent the pressure in the cavity 1514 from increasing. In particular, with an impact having a duration of approximately 10 to 60 milliseconds, the pressure bleeding from the second tube 1512 will not appreciably affect the short term operation of the valve 1002-C.

After the port for the first tube 1510 is closed by the first piston 1104″, the second tube 1512 continues to relieve the pressure in the cavity 1514, which causes the return piston 1508 to slowly move toward the adjustment bolt 1506, which reduces the force applied to the spring 1116 by the return piston 1508. With less force on the spring 1116, the first piston 1104″ requires less pressure at the inlet port 1112 to keep the ball 1310 from engaging the seat 1312.

The illustrated embodiment of the variable dispersion return valve 1002-C opens at a setpoint pressure and as the pressure shoots past the setpoint value, the valve 1002-C will partially close with pressure at the inlet port 1112 greater than the setpoint pressure. That is, the valve 1002-C opens to relieve the immediate pulse of pressure from an impact and then, after a short delay, begins to shut down as the input pressure is used as feedback to control the pressure relief through the valve 1002-C. With the feedback, the valve 1002-C opens quickly and shuts down quickly, serving to disperse more force from an impact with less travel of the piston rod 106 in the cylinder 112. In the illustrated embodiment, the first tube 1510 has an inlet port 1510-B that is offset from the valve seat 1312, which results in a step function for the feedback. That is, until the first piston 1104″ moves sufficiently to expose the inlet port 1510-B of the first tube 1510 to the pressurized fluid 204 from the valve inlet port 1112, the return piston 1508 remains seated against the adjustment bolt 1506.

The time before the return piston 1508 begins to engage is determined by the size of the orifice 1516 in the first tube 1510 and the area of the return piston 1508 in the cavity 1514. The size of the orifice 1518 in the second tube 1512 determines the release rate for the pressure in the cavity 1514.

Figure 16:
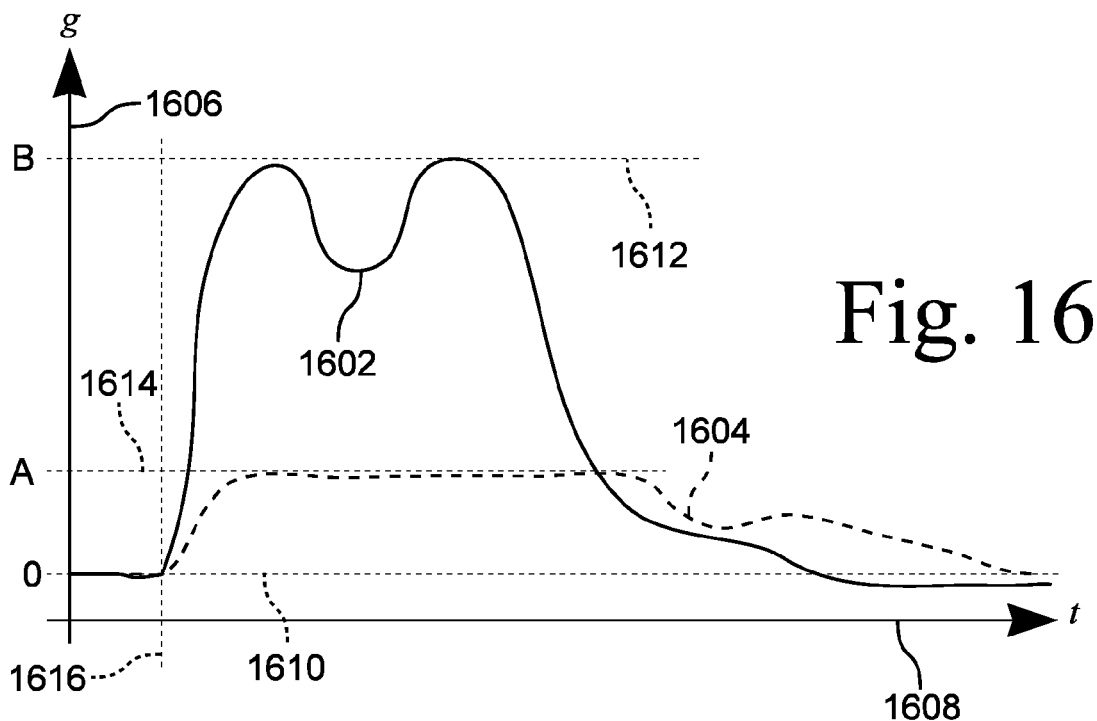
FIG. 16 is a graph showing test results of one embodiment of an impact dispersal system with a variable valve.

FIG. 16 illustrates a graph showing test results of one embodiment of an impact dispersal system 100 with a variable dispersion valve 1002. The graph plots time t along one axis 1608 versus deceleration in g along the other axis 1606. A test apparatus was a cart constructed with two accelerometers. One accelerometer was mechanically connected to the piston rod 106 and experienced the full force of the impact. The full force of the impact over time is shown by curve 1602, which quickly ramps up at the time 1616 of impact to a maximum g-force of approximately B g's illustrated by line 1612. After a period of approximately 10 to 60 milliseconds, the force decreases to less than 0 g's as the piston rod 106 rebounds from the impact.

Another accelerometer was attached to the frame of the apparatus and experienced the force of the impact that remained after dispersion by the impact dispersal system 100. The force of the impact after dispersion is shown by curve 1604, which ramps up at the time 1616 of impact to a maximum g-force of approximately A g's illustrated by line 1614. The deceleration remains constant for a period and then decreases to 0 g's.

The chart illustrates, for one high g-force impact, the significant decrease in g-force by using an impact dispersal system 100 with a variable dispersion valve 1002. The difference between the two curves 1602, 1604 indicates the effectiveness of the impact dispersal system 100. In various tests, the force after dispersion A was seen to decrease by approximately 86% of various impact forces B. For example, with an impact force B of 60 g's, the force after dispersion A is 8.4 g's, which is survivable.

Figure 17:
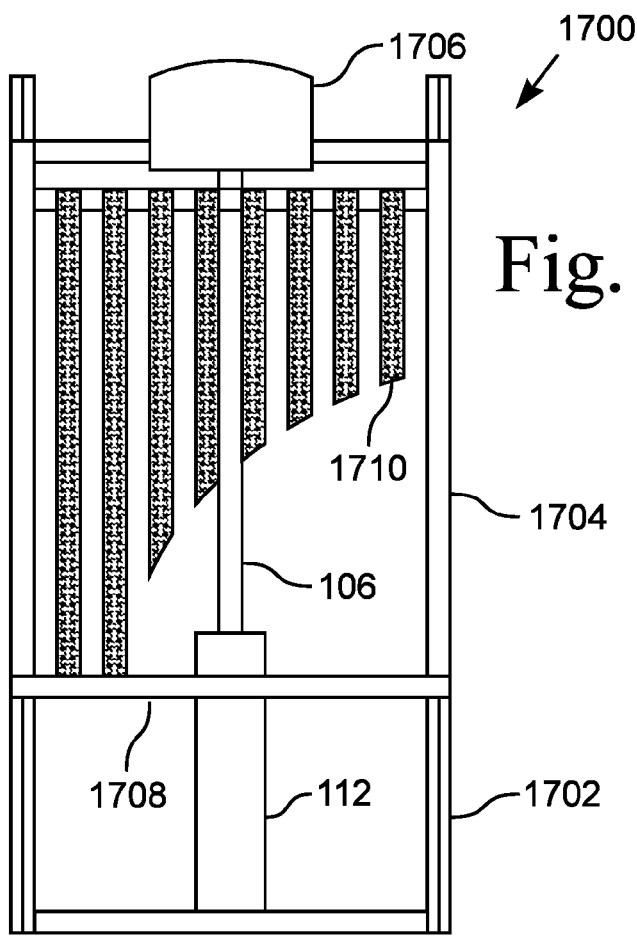
FIG. 17 is a front view of one embodiment of an aircraft seat with an impact dispersal system.
Figure 18:
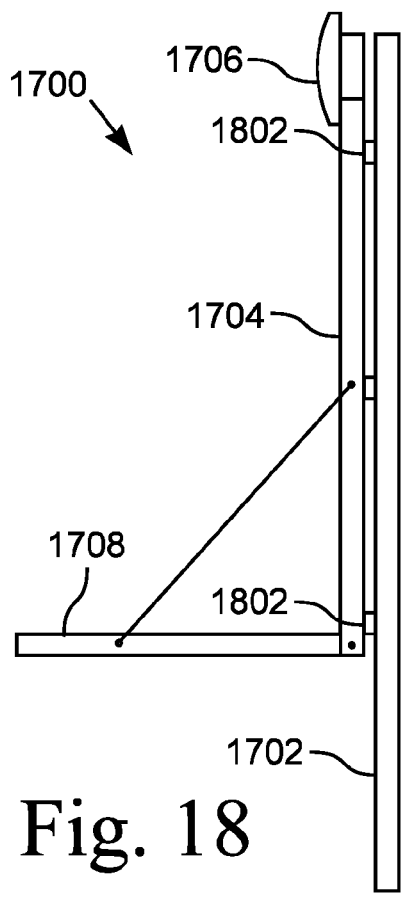
FIG. 18 is a side view of the aircraft seat of FIG. 17.

FIG. 17 illustrates a front view of one embodiment of an aircraft seat 1700 with an impact dispersal system 100. FIG. 18 illustrates a side view of the aircraft seat 1700 of FIG. 17. The aircraft seat 1700 includes a seat bottom 1708 hingedly attached to a seat back 1704 and a headrest 1706 attached to the seat back 1704. The aircraft seat 1700 also includes webbing 1710 that supports a passenger occupying the aircraft seat 1700. The seat back 1704 includes rollers 1802 that engage two runners 1702 that are attached to a bulkhead or other vertical support. The aircraft seat 1700 moves vertically on the rollers 1802. Attached to the frame of the seat back 1704 is the piston rod 106 that extends from a cylinder 112. With fluid 204 in the cylinder 112 and the piston rod 106 extended, the aircraft seat 1700 is supported by the piston rod 106.

In one embodiment, the aircraft seat 1700 disperses the impact from a hard landing. The seat occupant is belted into the aircraft seat 1700, typically with a 5-point harness (not illustrated). Upon impact from a hard landing, the seat 1700 forces the piston rod 106 into the cylinder 112. The pressurized fluid 204 flows through a variable dispersion valve 1002 and the fluid 204 is either directed to a reservoir 1204 or outside the aircraft. In another embodiment, the fluid 204 flows through at least one relief valve 302 and flow restrictor 116.

In another embodiment, the aircraft's pilot determines that a hard landing is imminent. The pilot actuates the extension valve 314, which causes the aircraft seat 1700 to rise as the piston rod 106 fully extends. On impact from the hard landing, the aircraft seat 1700 forces the piston rod 106 into the cylinder 112, thereby dispersing the impact force.

The vertical orientation of the runners 1702 restrains the aircraft seat 1700 to move vertically. During a hard landing the impact forces displace the seat 1700 vertically and the seat occupant experiences the impact along the vertical axis. The impact dispersal system 100 immediately disperses the force of the hard landing and then systematically shuts down so that the seat occupant experiences a relatively constant, low g-force, thereby avoiding injury.

In yet another embodiment, the impact dispersal system 100 is incorporated in an aircraft ejection seat. The dispersal system 100 is deployed immediately before the seat is ejected and isolates the occupant from the impact caused from the explosive ejection of the seat from the aircraft. In such an embodiment, the runners 1702 are attached to a framework that secures the seat 1700 to the aircraft. The framework is subject to the explosive ejection forces, and the seat 1700 is isolated from the explosive ejection forces by the impact dispersal system 100.

Figure 19:
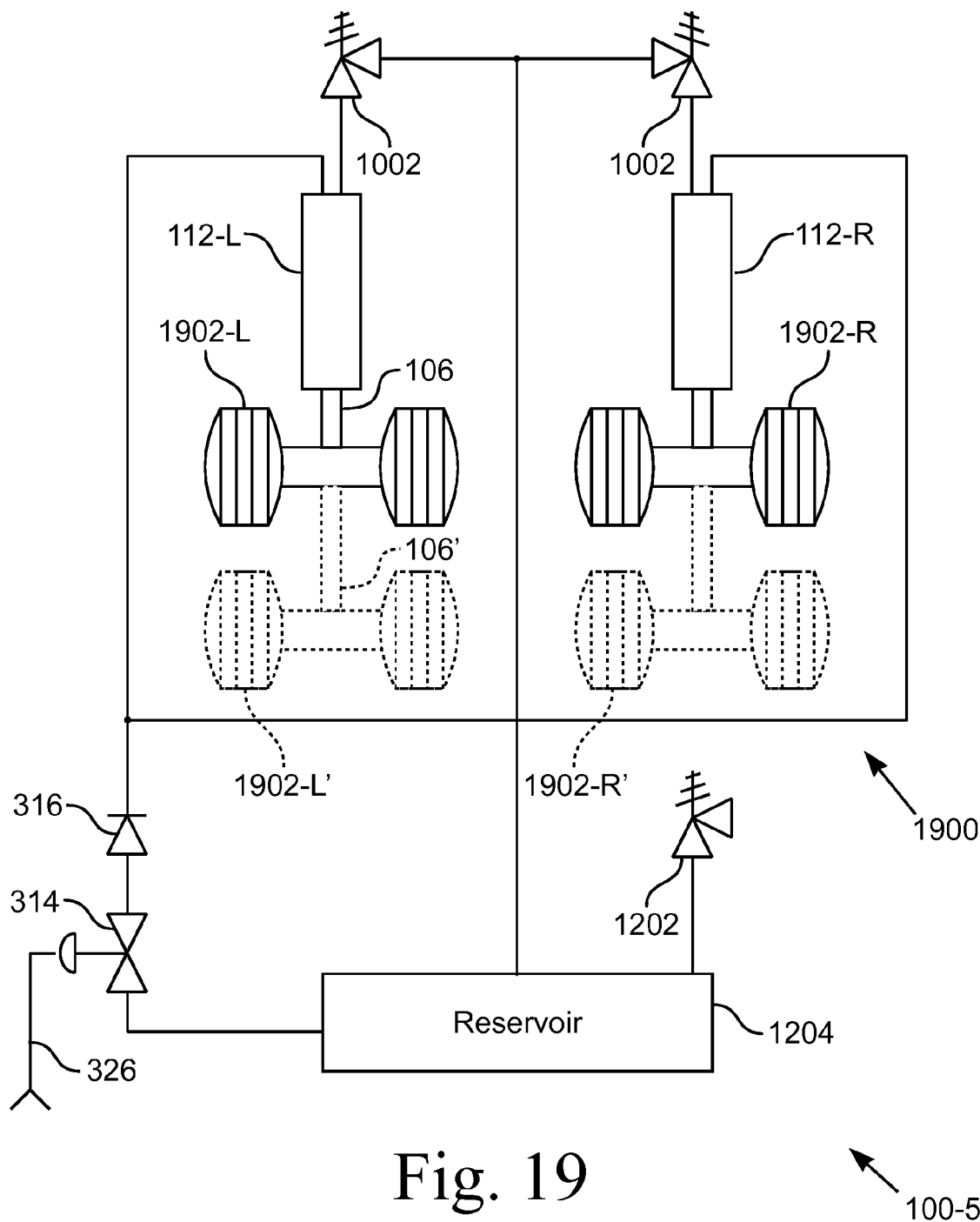
FIG. 19 is a schematic diagram of another embodiment of an impact dispersal system attached to an aircraft landing gear assembly.

FIG. 19 illustrates a schematic diagram of another embodiment of an impact dispersal system 100-5 attached to an aircraft landing gear assembly 1900. The illustrated landing gear assembly 1900 includes a pair of cylinders 112-L, 112-R, each with a piston rod 106 attached to a pair of wheels 1902-L, 1902-R. The wheels 1902-L, 1902-R are normally maintained in a retracted position, but when a hard landing is imminent, the wheels 1902-L', 1902-R' are extended by opening the extension valve 314. In the extended position, the wheels 1902-L', 1902-R' are able to take advantage of the full stroke of the cylinders 112-L, 112-R. Those skilled in the art will recognize that the number of wheels 1902-L, 1902-R and their configuration can vary without departing from the spirit and scope of the invention. In another embodiment, the wheels 1902-L', 1902-R' are normally maintained in the extended position. In such an embodiment, the system 100-5 is preset and does not require the reservoir 1204.

In one embodiment, the aircraft's pilot determines that a hard landing is imminent. The pilot actuates the extension valve 314, which causes the aircraft wheels 1902-L, 1902-R to extend as the piston rods 106 extend. On impact from the hard landing, the aircraft wheels 1902-L', 1902-R' force the piston rods 106 into the cylinders 112-L, 112-R, thereby dispersing the impact force. On impact, the fluid 204 is forced from the cylinders 112-L, 112-R through the variable dispersion valves 1002 and into the reservoir 1204. In another embodiment, the fluid 204 is ejected into the environment and not the reservoir 1204.

In one embodiment, after landing, the weight of the aircraft supported by the landing gear assembly 1900 is sufficient to force the fluid 204 remaining in the cylinders 112-L, 112-R through the variable dispersion valves 1002 and into the reservoir 1204. In such a manner, the impact dispersal system 100-5 is restored to a normal, retracted position.

In other embodiments, the impact dispersal system 100 is configured to attach to members that are subject to impact or explosive forces. For example, blasting plates are attached to the impact dispersal system 100 to disperse the impact on the blasting plates from explosions and direct hits on the plates. Another example is a vehicle with a cage that is attached to the impact dispersal system 100. The occupants are isolated in the cage from any impacts and explosions to which the vehicle is subjected.

The impact dispersal system 100 includes various functions. The function of receiving an impact is implemented, in one embodiment, by the bumper 102 connected to the cylinder 112 as illustrated in FIG. 1. In another embodiment, the function of receiving an impact is implemented by the seat back 504 that is connected to the cylinder 412 as illustrated in FIG. 5. In still another embodiment, the function of receiving an impact is implemented by the feet 602 upon which the vehicle, or object, 602 lands after being dropped, as illustrated in FIG. 6. In yet another embodiment, the function of receiving an impact is implemented by the seat 1700 that supports an occupant, as illustrated in FIGS. 17 and 18. In still yet another embodiment, the function of receiving an impact is implemented by the landing gear 1900 with wheels 1902-L', 1902-R' that receive an impact from a hard landing, as illustrated in FIG. 19.

The function of retracting a seat belt 702 for securing a passenger to the seat back 504 is implemented, in one embodiment, by the seat belt harness retractor assembly 708 as illustrated in FIGS. 7, 8, and 9. In one embodiment, the seat belt harness retractor assembly 708 includes a conventional seat belt retractor with an automatic locking device. In another embodiment, the seat belt harness retractor assembly 708 includes a manual locking device including a pawl 804 engaging a toothed wheel 802 with the pawl 804 responding to an actuator 908.

From the foregoing description, it will be recognized by those skilled in the art that an impact dispersal system 100 has been provided. This system 100, in its various embodiments, includes a cylinder 112 with a piston rod 106 adapted to receive the forces from an impact. The cylinder 112 has a fluid 204 that is forced out of the cylinder 112 by the impact. In one embodiment, the fluid 204 is a liquid that is suitable for the environment in which it is used. In such an embodiment, the cylinder 112 is a hydraulic cylinder. In another embodiment, the fluid is a compressed gas, such as air. In such an embodiment, the cylinder 112 is a pneumatic cylinder. In the various embodiments, the fluid 204 passes through a variable dispersion valve 1002. Those skilled in the art will recognize that either the cylinder 112 or piston rod 106 can be attached to the impact receiving member without departing from the spirit and scope of the present invention.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for an impact dispersal system, said apparatus comprising:
   a valve body having a first bore and a second bore, said first bore in communication with said second bore;
   a first piston having a seat, said first piston sliding within said first bore, said seat of said first piston configured to releasably seal an inlet port when said first piston is in a first position;
   a second piston having a distal end sliding within said second bore, said second bore and said distal end of said second piston defining a cavity;
   a spring biasing said first piston away from said second piston, said spring dimensioned and configured to seal said inlet port until a specified pressure is applied to said inlet port; and
   a first fluid conduit between said cavity and said first bore adjacent said inlet port, said first fluid conduit blocked by said first piston when said first piston is in said first position, said first fluid conduit in fluid communication with said cavity when said first piston is in a second position.

2. The apparatus of claim 1 further including a cylinder having a cylinder piston and a first fluid chamber configured to receive a fluid, and said first fluid chamber in fluid communication with said inlet port.

3. The apparatus of claim 2 further including a reservoir and a first valve, said reservoir configured to contain a volume of said fluid under a specified pressure, said first valve being operable to communicate said fluid to said first fluid chamber thereby moving said cylinder piston to an extended position.

4. The apparatus of claim 3 further including a second valve, said second valve being a check valve preventing said fluid from flowing from said first fluid chamber through said first valve.

5. The apparatus of claim 1 further including a stop member dimensioned and configured to prevent said first piston from traveling beyond a specified point in said first bore away from said inlet port.

6. The apparatus of claim 1 further including a second fluid conduit connected to said cavity, and said second fluid conduit dimensioned and configured to bleed a fluid from said cavity.

7. The apparatus of claim 1 wherein said second portion of said second piston has a diameter that is greater than a diameter of said first piston.

8. The apparatus of claim 1 wherein said seat is a ball seat, said body including a corresponding orifice configured to mate with said ball seat to seal said inlet port.

9. An apparatus for an impact dispersal system, said apparatus comprising:
   a valve body having a first bore in communication with a second bore, said first bore having a distal end defining an inlet port, said first bore having an outlet port, said first bore having an orifice positioned proximate said inlet port;
   a first piston movable longitudinally within said first bore, said first piston having a seal between said first piston and a surface of said first bore, a distal end of said first piston configured to releasably seal said inlet port when said first piston is in a first position;
   a second piston movable longitudinally within said second bore, said second piston having a seal between said second piston and a surface of said second bore, said second piston biased away from said first piston; and
   a cavity defined by a distal face of said second piston, a portion of said second bore, and an end of said valve body, said cavity having a first opening in fluid communication with said orifice, said cavity having a second opening in fluid communication with said outlet port.

10. The apparatus of claim 9 further including a stop protruding into said cavity of said second bore, said stop defining an operating setpoint for a pressure at said inlet port sufficient to establish fluid communication between said inlet port and said outlet port.

11. The apparatus of claim 10 wherein said stop is adjustable.

12. The apparatus of claim 9 wherein said second bore has a diameter that is greater than a diameter of said first bore.

13. The apparatus of claim 9 further including a stop member positioned between said first piston and said second piston, said first bore being coaxial with said second bore, and said stop member having a length defined by a minimum distance between said first and second piston.

14. The apparatus of claim 9 wherein said orifice is positioned such that fluid communication is established from said inlet port to said outlet port before fluid communication is established from said inlet port to said orifice.

15. The apparatus of claim 9 wherein said first bore is coaxial with said second bore, and said second piston has a first end engaging said second bore and a second end engaging said first bore.

16. The apparatus of claim 9 wherein said outlet port provides a graduated flow through said outlet port as said first piston moves away from said first position.

17. The apparatus of claim 9 wherein said first and second pistons are dimensioned and said orifice is positioned such that a fluid with a pressure greater than a setpoint causes said first piston to unseat, thereby establishing fluid communication between said inlet port and said outlet port and pressurizing said cavity to bias said first piston towards said first position.

18. An apparatus for an impact dispersal system, said apparatus comprising:
- a valve body having a first bore and a second bore, said first bore having a distal end defining an inlet port, said first bore having an outlet port, said first bore having an orifice positioned proximate said inlet port;
- a first piston movable longitudinally within said first bore, said first piston having a seal between said first piston and a surface of said first bore, a distal end of said first piston configured to releasably seal said inlet port when said first piston is in a first position;
- a second piston movable longitudinally within said second bore, said second piston having a seal between said second piston and a surface of said second bore, said second piston coupled to said first piston; and
- a cavity defined by a distal face of said second piston, a portion of said second bore, and an end of said valve body, said cavity having a first opening in fluid communication with said orifice, said cavity having a second opening in fluid communication with said outlet port;
- whereby said first and second pistons are dimensioned and said orifice is positioned such that a fluid with a pressure greater than a setpoint causes said first piston to unseat, thereby establishing fluid communication between said inlet port and said outlet port and also establishing fluid communication between said orifice and said cavity and pressurizing said cavity to bias said first piston towards said first position.

19. The apparatus of claim 18 wherein said first bore is coaxial with said second bore, and further including a spring biasing said first piston away from said second piston.

20. The apparatus of claim 19 further including a stop between said first and second piston, said stop defining a maximum compression of said spring wherein when said spring is compressed to said maximum compression, said stop causes said first piston to move in tandem with said second piston.

* * * * *